US011835156B2

(12) United States Patent
Di Carlo et al.

(10) Patent No.: US 11,835,156 B2
(45) Date of Patent: Dec. 5, 2023

(54) CONDUITS FOR TRANSPORTING FLUIDS AND METHODS OF FABRICATING THE SAME

(71) Applicant: The Boeing Company, Chicago, IL (US)

(72) Inventors: Tony Di Carlo, Long Beach, CA (US); Brian T. Vaniman, Fountain Valley, CA (US); John P. Leuer, Newport Beach, CA (US)

(73) Assignee: The Boeing Company, Arlington, VA (US)

( * ) Notice: Subject to any disclaimer, the term of this patent is extended or adjusted under 35 U.S.C. 154(b) by 714 days.

(21) Appl. No.: 16/992,437

(22) Filed: Aug. 13, 2020

(65) Prior Publication Data

US 2020/0370681 A1 Nov. 26, 2020

Related U.S. Application Data

(62) Division of application No. 16/228,089, filed on Dec. 20, 2018, now Pat. No. 10,788,148.

(51) Int. Cl.
*G01M 3/18* (2006.01)
*B21D 15/06* (2006.01)
(Continued)

(52) U.S. Cl.
CPC ............ *F16L 5/022* (2013.01); *B21C 37/154* (2013.01); *B21D 15/06* (2013.01); *F16L 27/111* (2013.01);
(Continued)

(58) Field of Classification Search
CPC ........ B21D 15/04; B21D 15/06; B21D 15/10; B21D 15/105; B21D 51/12; B21C 37/123;
(Continued)

(56) References Cited

U.S. PATENT DOCUMENTS 2,014,355 A ‡ 9/1935 Shikagawa ........... G01M 13/00
73/118
2,589,041 A * 3/1952 Bremer ................ B21C 37/124
156/207
(Continued)

FOREIGN PATENT DOCUMENTS

DE 1775487 9/1971
DE 4134899 C1 * 5/1993 ............ F16L 11/115
(Continued)

OTHER PUBLICATIONS

A Practical Guide to Expansion Joints, Expansion Joint Manufacturers Association, Inc., pp. 1-71, Tarrytown, NY. This electronic copyrighted material was made and delivered to the government under license from Expansion Joint Manufacturers Association—No further reproduction is permitted.‡
(Continued)

*Primary Examiner* — Katrina M Stransky
*Assistant Examiner* — Jared O Brown
(74) *Attorney, Agent, or Firm* — Kunzler Bean & Adamson

(57) ABSTRACT

A method of fabricating a conduit comprises simultaneously corrugating three plies to form a bellows. The method also comprises simultaneously trimming a corrugated inboard ply and a first corrugated outboard ply of the bellows. The method further comprises locating a weld-through ring and a second weld-through ring between the corrugated inboard ply and the first corrugated outboard ply. The method additionally comprises forming a port and a second port through the weld-through ring and the second weld-through ring, respectively. The method also comprises communicatively coupling a sensor and a second sensor with an interstitial space, interposed between the corrugated inboard
(Continued)

play and the first corrugated outboard ply, via the port and the second port, respectively.

20 Claims, 20 Drawing Sheets

(51) Int. Cl.
*B21C 37/15* (2006.01)
*B21D 51/12* (2006.01)
*F16L 5/02* (2006.01)
*F16L 27/111* (2006.01)

(52) U.S. Cl.
CPC .............. *G01M 3/18* (2013.01); *B21D 51/12* (2013.01); *F16L 2201/30* (2013.01)

(58) Field of Classification Search
CPC ... B21C 37/124; B21C 37/125; B21C 37/205; B21C 37/207; Y10T 29/49877; F16L 27/111; F16L 51/00; F16L 51/025; F16L 2201/30; G01M 3/18; G01M 3/182
USPC .................. 72/370.19, 59; 138/121, 122
See application file for complete search history.

(56) References Cited

U.S. PATENT DOCUMENTS

| | | | | |
|---|---|---|---|---|
| 2,663,324 A * | 12/1953 | Fentress | ............... | B21C 37/205 29/454 |
| 3,063,142 A * | 11/1962 | Kroon | ..................... | F16L 11/15 29/454 |
| 3,183,022 A | 5/1965 | Adnre | | |
| 3,232,640 A | 2/1966 | Donkle | | |
| 3,299,417 A * | 1/1967 | Sibthorpe | ................. | F16L 9/18 340/626 |
| 3,472,062 A ‡ | 10/1969 | Owen | ................ | G01M 3/3218 73/40.5 R |
| 3,655,224 A | 4/1972 | Carberry et al. | | |
| 3,725,565 A | 4/1973 | Schmidt | | |
| 3,831,498 A | 8/1974 | Harrington | | |
| 3,833,245 A | 9/1974 | Davis | | |
| 3,934,618 A | 1/1976 | Henderson | | |
| 4,453,304 A * | 6/1984 | Astill | ...................... | F16J 3/047 72/121 |
| 4,511,162 A | 4/1985 | Broyles | | |
| 4,644,780 A ‡ | 2/1987 | Jeter | ..................... | F16L 55/005 138/104 |
| 4,848,408 A ‡ | 7/1989 | Fortmann | ............. | F16L 51/025 138/104 |
| 4,854,416 A ‡ | 8/1989 | Lalikos | .................... | D04C 1/02 181/207 |
| 5,343,738 A ‡ | 9/1994 | Skaggs | .................. | F16L 11/121 138/11 |
| 5,969,618 A ‡ | 10/1999 | Redmond | ............... | G01M 3/18 174/11 |
| 5,992,900 A ‡ | 11/1999 | Heller | ..................... | F16L 27/11 137/12 |
| 6,497,030 B1 * | 12/2002 | Marando | .............. | B21D 26/051 29/523 |
| 6,587,328 B2 * | 7/2003 | Bigler | ...................... | H01G 5/00 361/279 |
| 8,474,489 B2 | 7/2013 | Gudme | | |
| 8,776,836 B2 | 7/2014 | Ragner et al. | | |
| 8,844,579 B2 ‡ | 9/2014 | Eguchi | .................... | F16L 11/16 138/121 |
| 9,422,933 B2 * | 8/2016 | Tatsumi | .................. | F04B 45/02 |
| 9,791,074 B2 | 10/2017 | Hoglund | | |
| 2005/0230924 A1 * | 10/2005 | Varriale | .................. | F16K 41/10 277/634 |
| 2005/0242577 A1 ‡ | 11/2005 | Baumann | ............ | F01N 13/1805 285/22 |
| 2020/0200293 A1 | 6/2020 | Di Carlo et al. | | |
| 2020/0200294 A1 | 6/2020 | Di Carlo et al. | | |
| 2020/0200302 A1 | 6/2020 | Di Carlo et al. | | |
| 2020/0200318 A1 | 6/2020 | Di Carlo et al. | | |
| 2020/0200319 A1 | 6/2020 | Di Carlo et al. | | |
| 2021/0164592 A1 | 6/2021 | Di Carlo et al. | | |

FOREIGN PATENT DOCUMENTS

| | | | | |
|---|---|---|---|---|
| DE | 102011003511 A1 * | 8/2012 | ............. | F01D 25/30 |
| EP | 2927471 ‡ | 7/2015 | | |
| FR | 2518214 | 6/1983 | | |
| GB | 954479 ‡ | 4/1964 | | |
| JP | S56154219 A * | 11/1981 | | |
| JP | S59232627 A * | 12/1984 | | |
| KR | 20030048965 A * | 6/2003 | | |
| KR | 20090016331 A * | 2/2009 | | |
| KR | 101527882 | 6/2015 | | |
| KR | 20150003906 U * | 10/2015 | | |
| KR | 20190037950 A * | 4/2019 | | |

OTHER PUBLICATIONS

Extended European Search Report concerning EP Patent Application No. 19195684.6 dated Feb. 17, 2020.‡
U.S. Appl. No. 17/314,602, filed May 7, 2021 with inventors Di Carlo et al.
U.S. Appl. No. 17/143,073, filed Jan. 6, 2021 with inventors Di Carlo et al.
U.S. Appl. No. 17/143,888, filed Jan. 7, 2021 with inventors Di Carlo et al.

\* cited by examiner
‡ imported from a related application (CONTINUED TO FIG. 11B)

CONDUITS FOR TRANSPORTING FLUIDS AND METHODS OF FABRICATING THE SAME

GOVERNMENT LICENSE RIGHTS

This invention was made with Government support under HR0011-17-9-0001 awarded by Defense Advanced Research Projects Agency. The government has certain rights in this invention.

TECHNICAL FIELD

The present disclosure relates to conduits for transporting fluids and methods of fabricating such conduits.

BACKGROUND

Flexible conduits, used in cryogenic propulsion systems, are susceptible to manufacturing variances and incidental damage. If not timely identified, failure of a flexible conduit, such as a pressurized-propellant feed line, could potentially lead to damage of the main propulsion system.

SUMMARY

Accordingly, apparatuses and methods, intended to address at least the above-identified concerns, would find utility.

The following is a non-exhaustive list of examples, which may or may not be claimed, of the subject matter, disclosed herein.

One example of the subject matter, disclosed herein, relates to a conduit for transporting a fluid. The conduit comprises a first collar that comprises a channel, which is cross-sectionally circumferentially closed, and a second collar. The conduit also comprises a bellows that comprises a central axis, a first corrugated outboard ply, a corrugated inboard ply, interposed between the first corrugated outboard ply and the central axis, an interstitial space, interposed between the corrugated inboard ply and the first corrugated outboard ply, and a second corrugated outboard ply within the interstitial space. The conduit further comprises a first weld, hermetically interconnecting the corrugated inboard ply, the first corrugated outboard ply, and the first collar. The conduit additionally comprises a second weld, hermetically interconnecting the corrugated inboard ply, the first corrugated outboard ply, and the second collar. The conduit also comprises a weld-through ring, located between the corrugated inboard ply and the first corrugated outboard ply and coupled to the first collar by the first weld. The conduit further comprises a sensor that is communicatively coupled with the interstitial space via the channel of the first collar. The second corrugated outboard ply is not hermetically coupled to the first collar or the second collar.

The conduit provides a compliant structure for transmission of fluids, such as cryogenic fuels, that accommodates displacements encountered during operation. A configuration of the weld-through ring and the interstitial space between the corrugated inboard ply and the corrugated outboard ply allows the sensor to monitor conditions within the interstitial space. In particular, the sensor enables detection of leaks in the corrugated inboard ply by detecting changes in conditions within the interstitial space. The first weld promotes a strong, reliable, and sealed connection between the corrugated inboard ply, the first corrugated outboard ply, and the first collar. Similarly, the second weld promotes a strong, reliable, and sealed connection between the corrugated inboard ply, the first corrugated outboard ply, and the second collar. The weld-through ring ensures communicative coupling between the interstitial space and the channel of the first collar, which establishes communicative coupling between the sensor and the interstitial space. Communicatively coupling the interstitial space with the sensor via the channel allows leaks of fluid or gas into the interstitial space through the corrugated inboard ply to be detected at a location, external to the first collar. The second corrugated outboard ply helps to stiffen the bellows.

Another example of the subject matter, disclosed herein, relates to a conduit for transporting a fluid. The conduit comprises a first collar that comprises a channel, which is cross-sectionally circumferentially closed. The conduit also comprises a bellows that comprises a central axis, a first corrugated outboard ply, and a corrugated inboard ply, interposed between the first corrugated outboard ply and the central axis. The bellows additionally comprises an interstitial space, interposed between the corrugated inboard ply and the first corrugated outboard ply. The bellows also comprises a second corrugated outboard ply, within the interstitial space. The conduit additionally comprises a first weld, hermetically coupling the corrugated inboard ply, the first corrugated outboard ply, and the first collar. The conduit also comprises a weld-through ring, located between the corrugated inboard ply and the first corrugated outboard ply and coupled to the first collar by the first weld. The conduit further comprises a sensor that is communicatively coupled with the interstitial space via the channel of the first collar. The second corrugated outboard ply is not hermetically coupled to the first collar.

The conduit provides a compliant structure for transmission of fluids, such as cryogenic fuels, that accommodates displacements encountered during operation. A configuration of the weld-through ring and the interstitial space between the corrugated inboard ply and the first corrugated outboard ply allows the sensor to monitor conditions within the interstitial space. In particular, the sensor enables detection of leaks in the corrugated inboard ply by detecting changes in conditions within the interstitial space. The first weld promotes a strong, reliable, and sealed connection between the corrugated inboard ply, the corrugated first outboard ply, and the first collar. The weld-through ring ensures communicative coupling between the interstitial space and the channel of the first collar, which establishes communicative coupling between the sensor and the interstitial space. Communicatively coupling the interstitial space with the sensor via the channel allows leaks of fluid or gas into the interstitial space through the corrugated inboard ply to be detected at a location, external to the first collar. The second corrugated outboard ply helps to stiffen the bellows.

Another example of the subject matter, disclosed herein, relates to a method of fabricating a conduit. The method comprises simultaneously corrugating a first tubular outboard ply, a second tubular outboard ply, inserted into the first tubular outboard ply, and a tubular inboard ply, inserted into the second tubular outboard ply, to form a bellows. The bellows comprises a central axis, a first corrugated outboard ply, a second corrugated outboard ply, a corrugated inboard ply, and an interstitial space, interposed between the corrugated inboard ply and the first corrugated outboard ply. The first corrugated outboard ply is formed from the first tubular outboard ply, the second corrugated outboard ply is formed from the second tubular outboard ply, and the corrugated inboard ply is formed from the tubular inboard ply. The method also comprises simultaneously trimming a first corrugated-inboard-ply end of the corrugated inboard ply and a first first-corrugated-outboard-ply end of the first corrugated outboard ply to create a trimmed first corrugated-inboard-ply end of the corrugated inboard ply and a trimmed first first-corrugated-outboard-ply end of the first corrugated outboard ply. The method further comprises simultaneously trimming a second corrugated-inboard-ply end of the corrugated inboard ply and a second first-corrugated-outboard-ply end of the first corrugated outboard ply to create a trimmed second corrugated-inboard-ply end of the corrugated inboard ply and a trimmed second first-corrugated-outboard-ply end of the first corrugated outboard ply. The method additionally comprises locating a weld-through ring between the corrugated inboard ply and the first corrugated outboard ply of the bellows at the trimmed first corrugated-inboard-ply end of the corrugated inboard ply and the trimmed first first-corrugated-outboard-ply end of the first corrugated outboard ply. The method also comprises locating a second weld-through ring between the corrugated inboard ply and the first corrugated outboard ply of the bellows at the trimmed second corrugated-inboard-ply end of the corrugated inboard ply 110 and the trimmed second first-corrugated-outboard-ply end of the first corrugated outboard ply. The method further comprises simultaneously attaching the trimmed first corrugated-inboard-ply end, the trimmed first first-corrugated-outboard-ply end, and the weld-through ring to a first collar with a first weld. The method additionally comprises simultaneously attaching the trimmed second corrugated-inboard-ply end, the trimmed second first-corrugated-outboard-ply end, and the second weld-through ring to a second collar with a second weld. The method also comprises forming a port through the weld-through ring along an axis, parallel with the central axis of the bellows, after attaching the weld-through ring to the first collar with the first weld, so that the port is communicatively coupled with the interstitial space. The method additionally comprises forming a second port through the second weld-through ring along a second axis, parallel with the central axis of the bellows, after attaching the second weld-through ring to the second collar with the second weld, so that the second port is communicatively coupled with the interstitial space. The method additionally comprises communicatively coupling a sensor with the interstitial space via the port. The method also comprises communicatively coupling a second sensor with the interstitial space via the second port and a second channel passing through the second collar.

The method facilitates fabricating the conduit with the sensor configured to detect leaks in the corrugated inboard ply of the bellows of the conduit. Simultaneously corrugating the first tubular outboard ply, the second tubular outboard ply, and the tubular inboard ply to form the bellows promotes complementary corrugations in the corrugated inboard ply, the first corrugated outboard ply, and the second corrugated outboard ply of the bellows. The ends of the plies being unconstrained relative to the first collar and the second collar, helps reduce stress on the plies of the bellows, during formation of the corrugations of the bellows, by allowing the plies to be freely slidable relative to each other as the corrugations are formed. Simultaneously trimming the first corrugated-inboard-ply end of the corrugated inboard ply and the first first-corrugated-outboard-ply end of the first corrugated outboard ply promotes controlled alignment of the trimmed first corrugated-inboard-ply end of the corrugated inboard ply and the trimmed first first-corrugated-outboard-ply end of the first corrugated outboard ply. Similarly, simultaneously trimming the second corrugated-inboard-ply end of the corrugated inboard ply and the second first-corrugated-outboard-ply end of the first corrugated outboard ply promotes controlled alignment of the trimmed second corrugated-inboard-ply end of the corrugated inboard ply and the trimmed second first-corrugated-outboard-ply end of the first corrugated outboard ply. The weld-through ring facilitates formation of the first weld while ensuring communicative coupling between the interstitial space and the channel of the first collar, which establishes communicative coupling between the sensor and the interstitial space. The second weld-through ring facilitates formation of the second weld while ensuring communicative coupling between the interstitial space and the second channel of the second collar, which establishes communicative coupling between the second sensor and the interstitial space. The port of the weld-through ring facilitates communicative coupling between the interstitial space and the channel of the first collar after formation of the first weld. The second port of the second weld-through ring facilitates communicative coupling between the interstitial space and the second channel of the second collar after formation of the second weld. Forming the port after the trimmed first corrugated-inboard-ply end, the trimmed first first-corrugated-outboard-ply end, and the weld-through ring are simultaneously attached to the first collar with the first weld allows communicative coupling between the interstitial space and the channel of the first collar after the first weld is formed. Forming the second port after the trimmed second corrugated-inboard-ply end, the trimmed second first-corrugated-outboard-ply end, and the second weld-through ring are simultaneously attached to the second collar with the second weld allows communicative coupling between the interstitial space and the second channel of the second collar after the second weld is formed. Communicatively coupling the interstitial space with the sensor via the port and the channel passing through the first collar allows leaks of fluid or gas into the interstitial space through the corrugated inboard ply to be detected at a location, external to the first collar. Communicatively coupling the interstitial space with the second sensor via the second port and the second channel passing through the second collar allows leaks of fluid or gas into the interstitial space through the corrugated inboard ply to be detected at a location, external to the second collar. The second corrugated outboard ply helps to stiffen the bellows.

BRIEF DESCRIPTION OF THE DRAWINGS

Figure 1A:
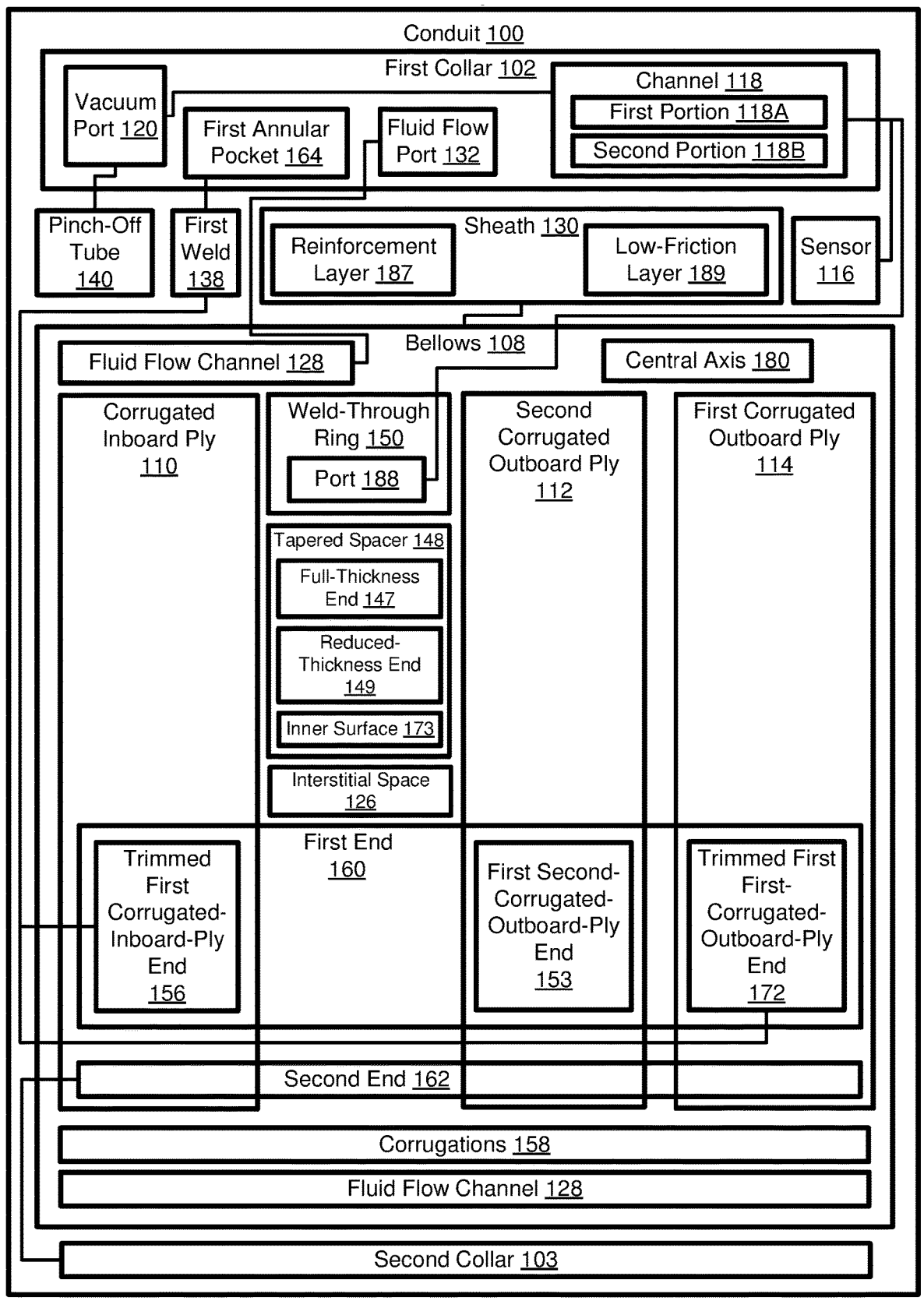
Figure 1B:
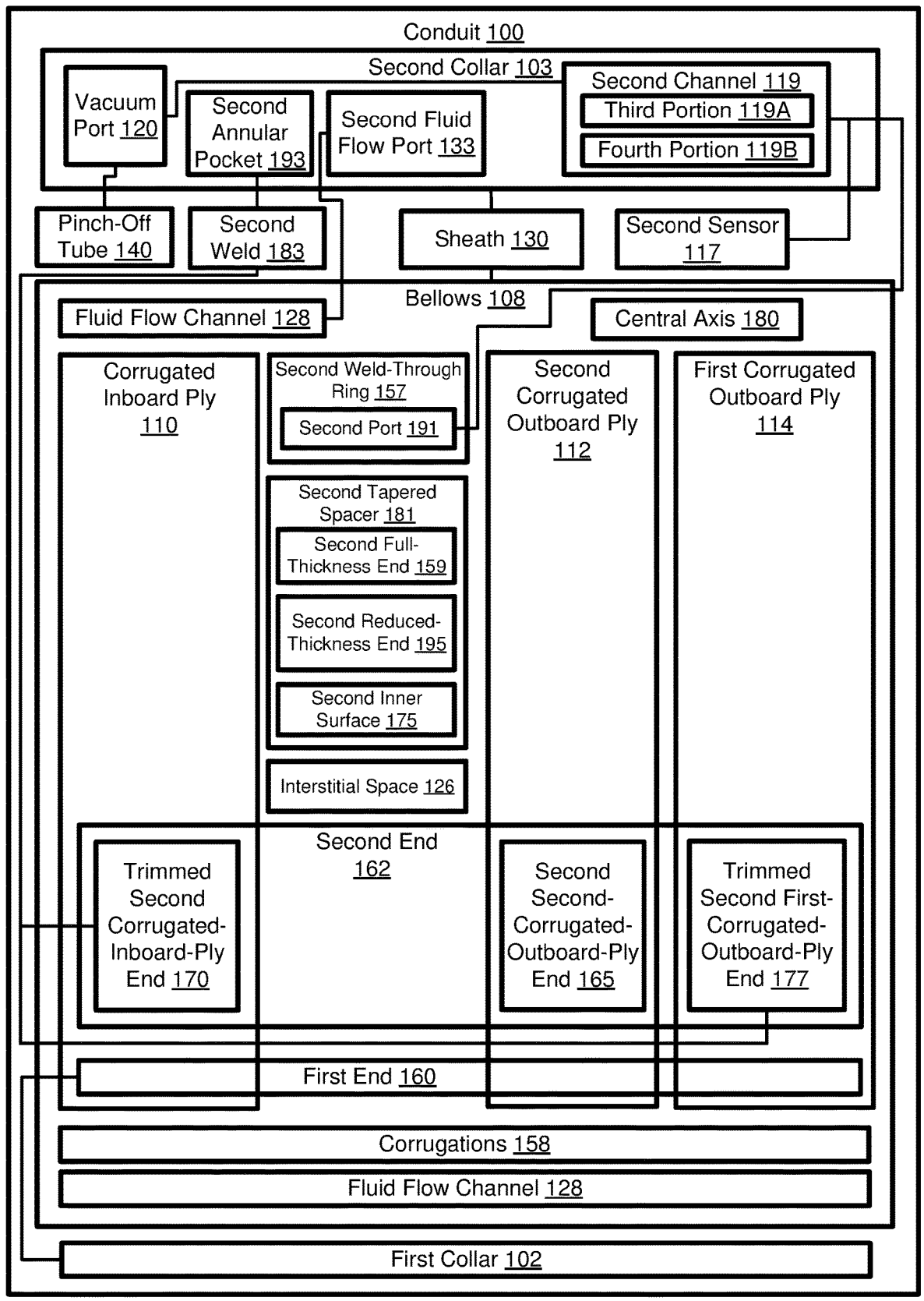
Figure 1C:
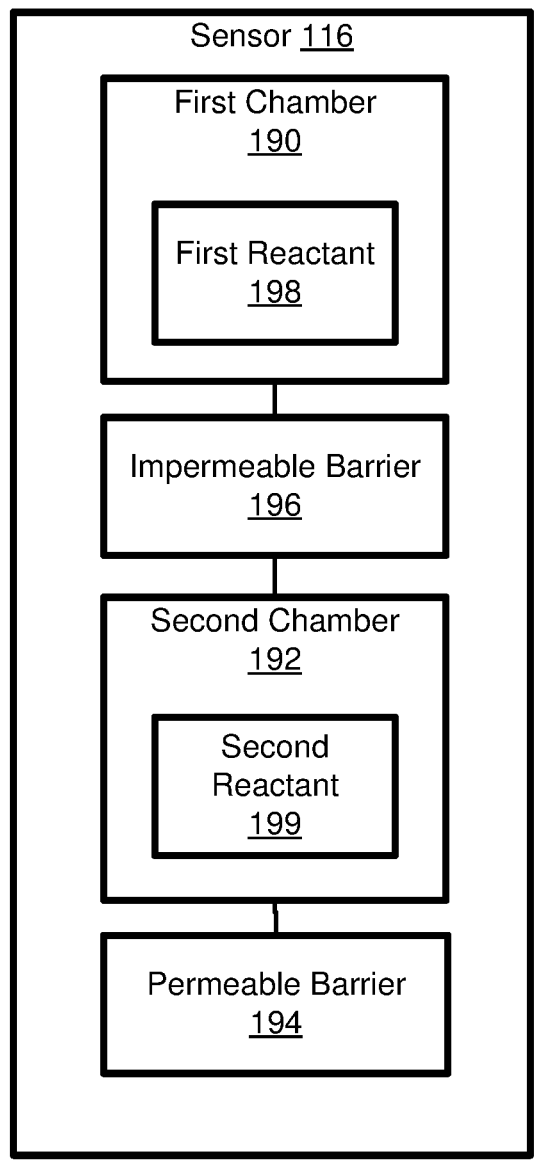
Figure 2:
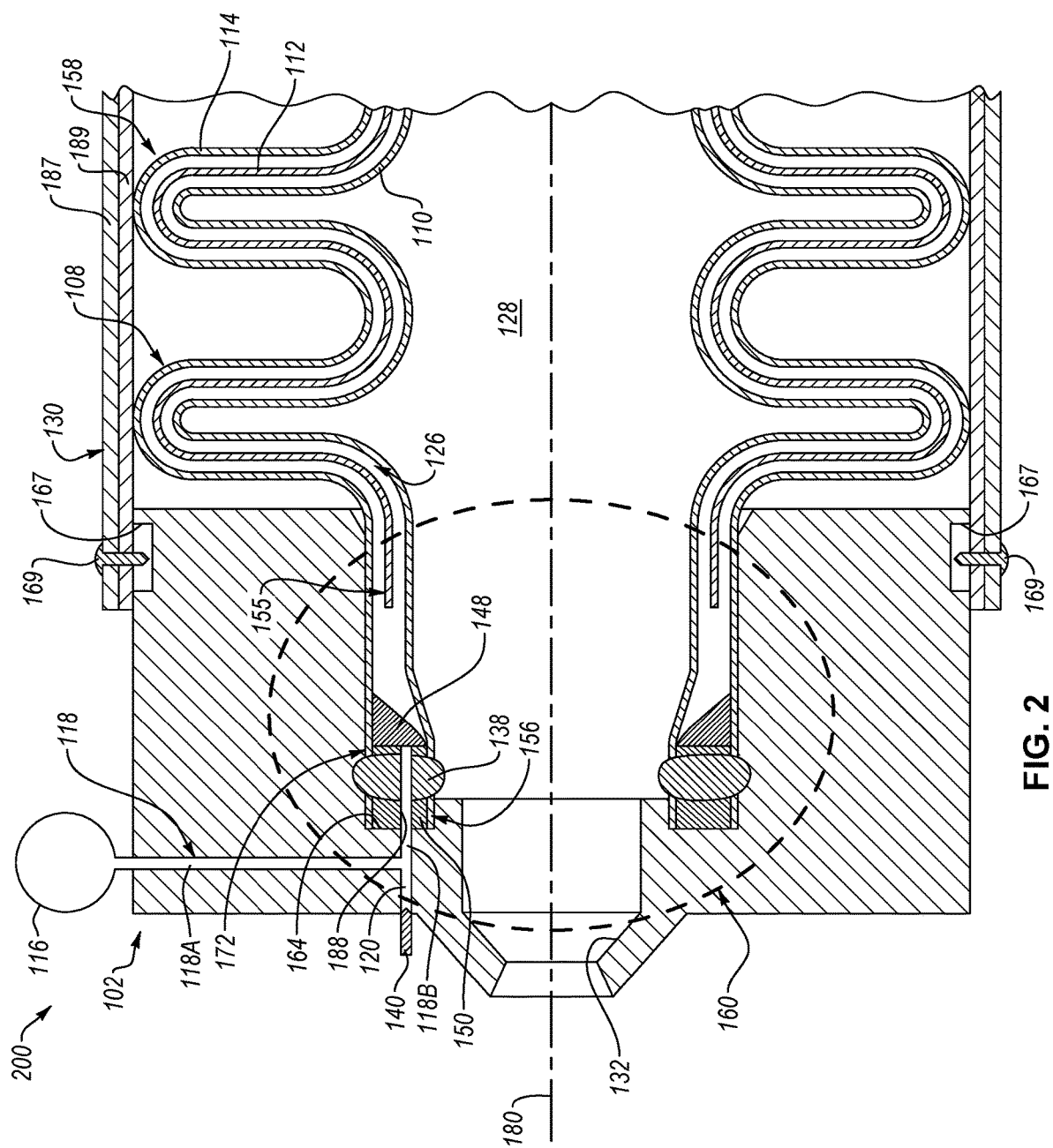
Figure 2A:
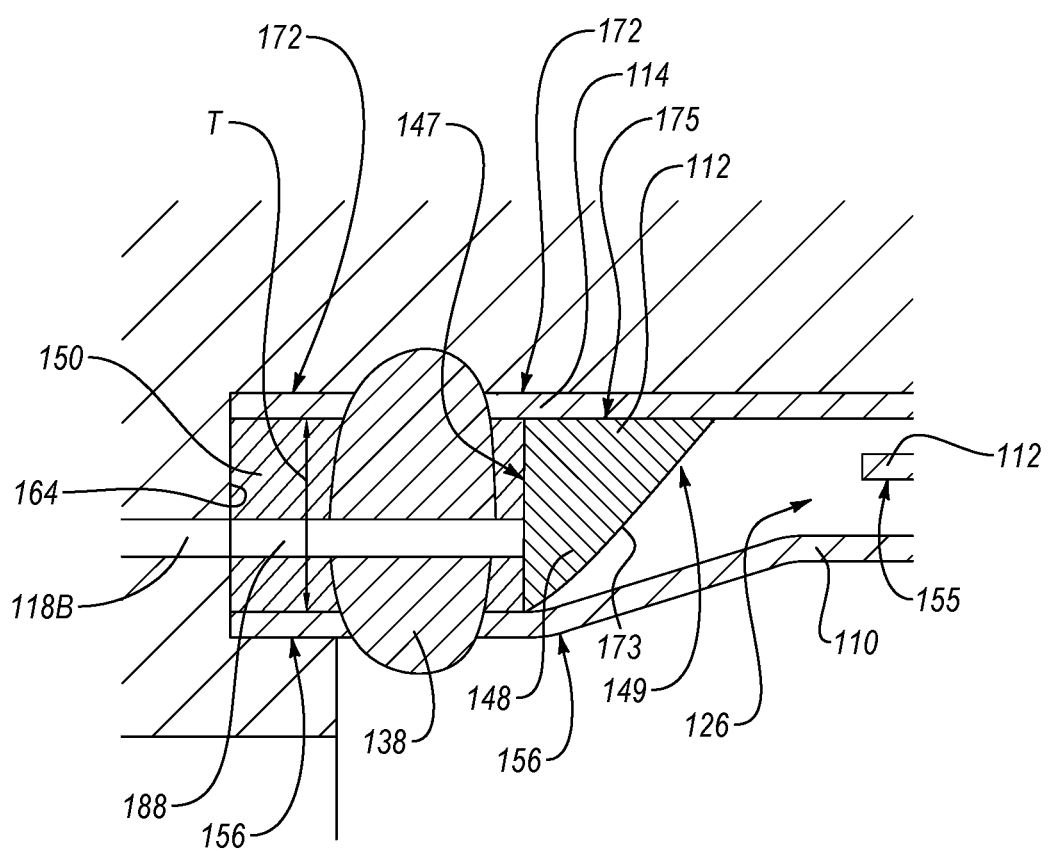
Figure 3:
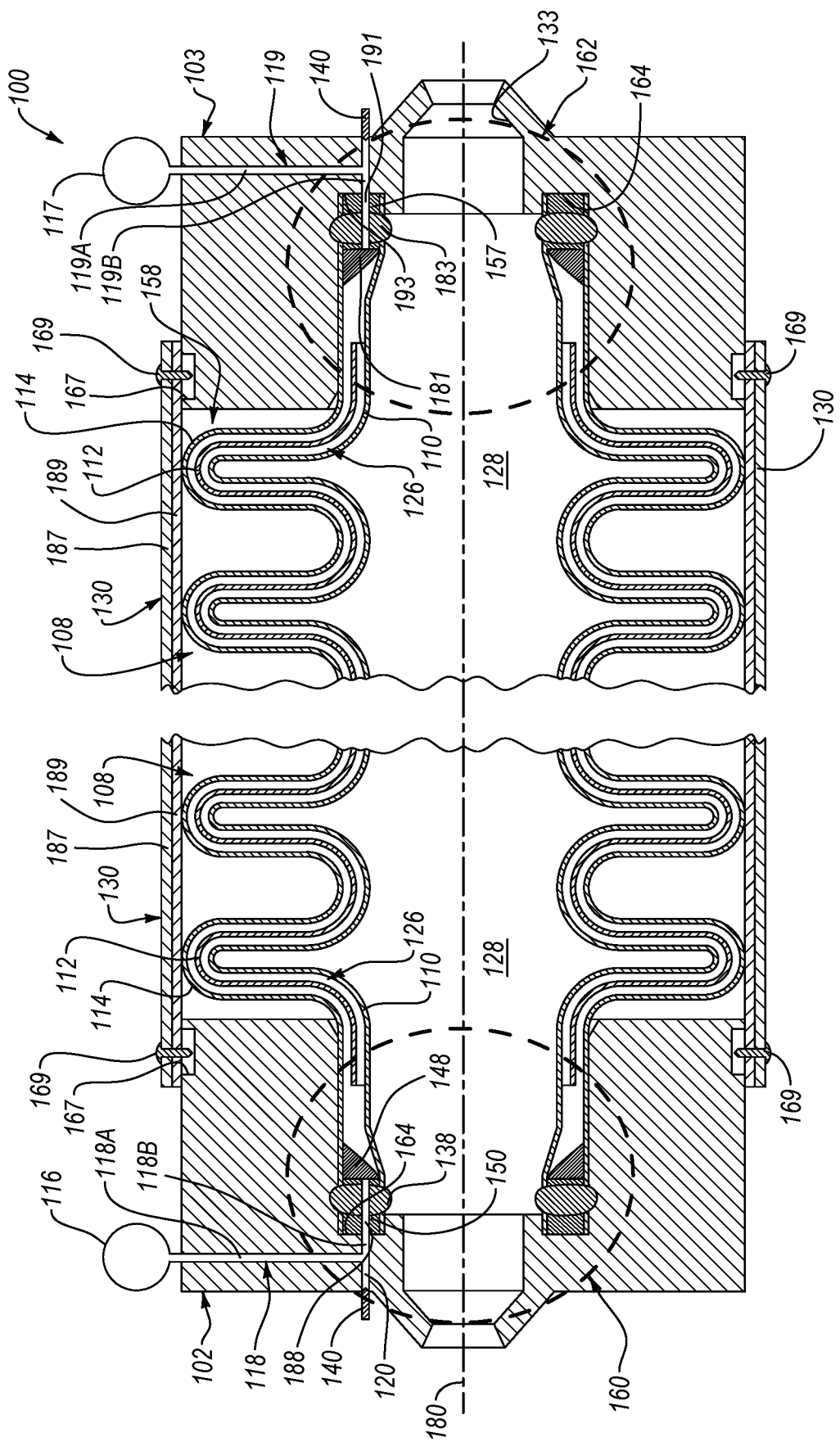
Figure 3A:
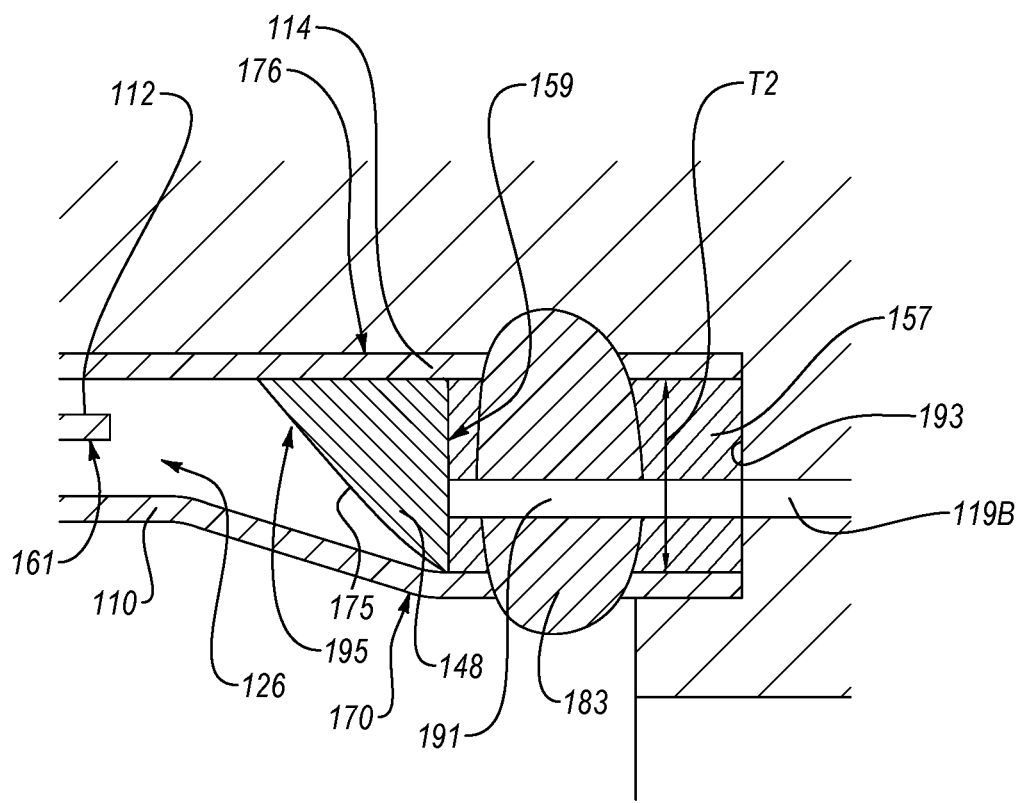
Figure 4:
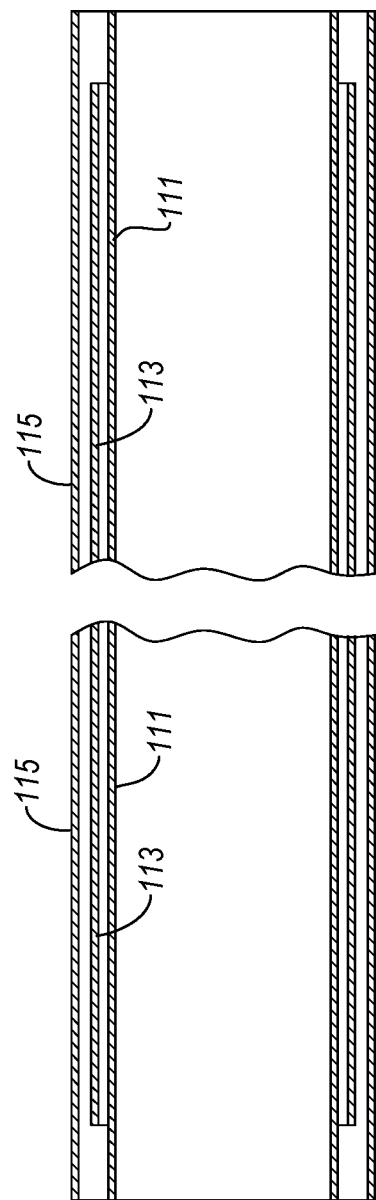
Figure 5:
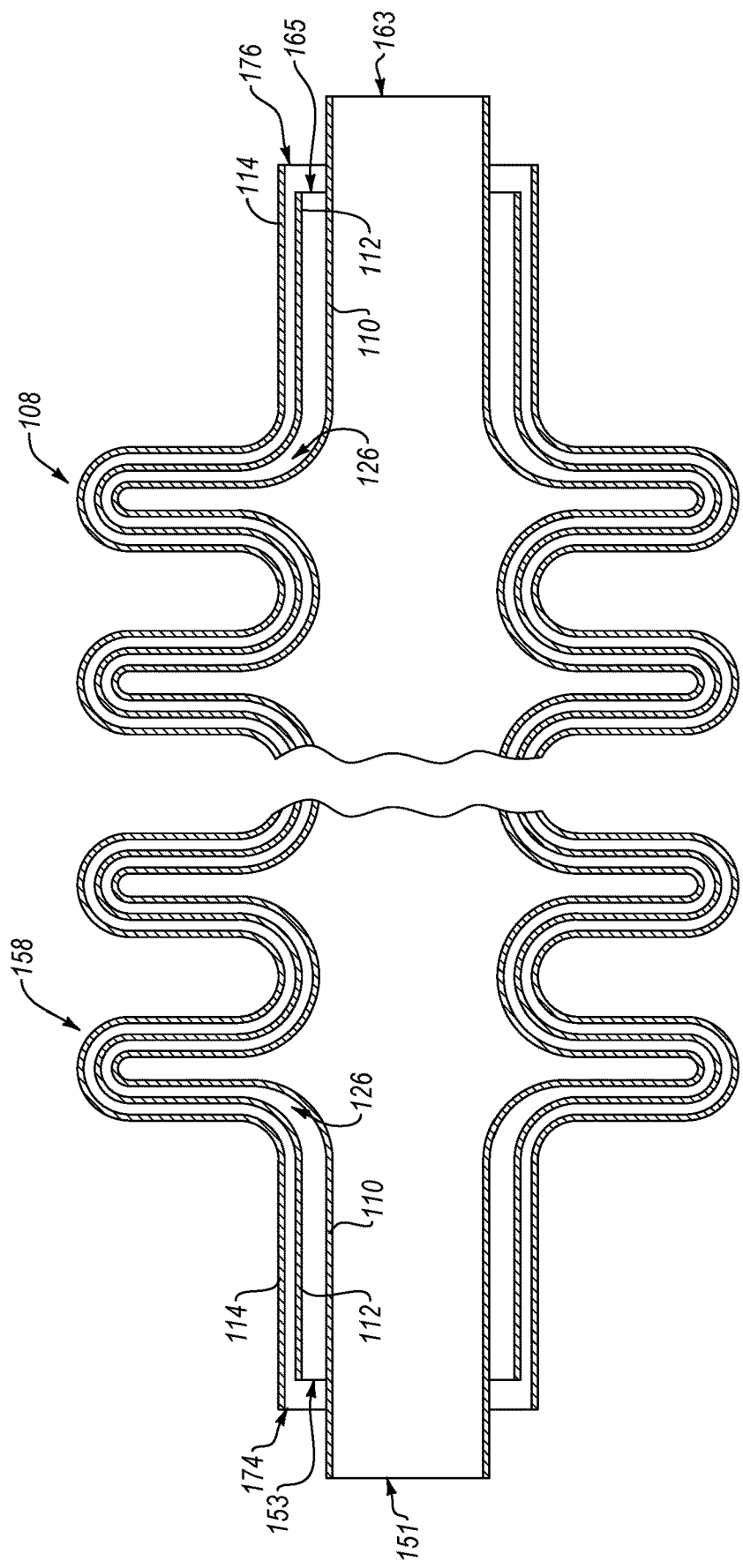
Figure 6:
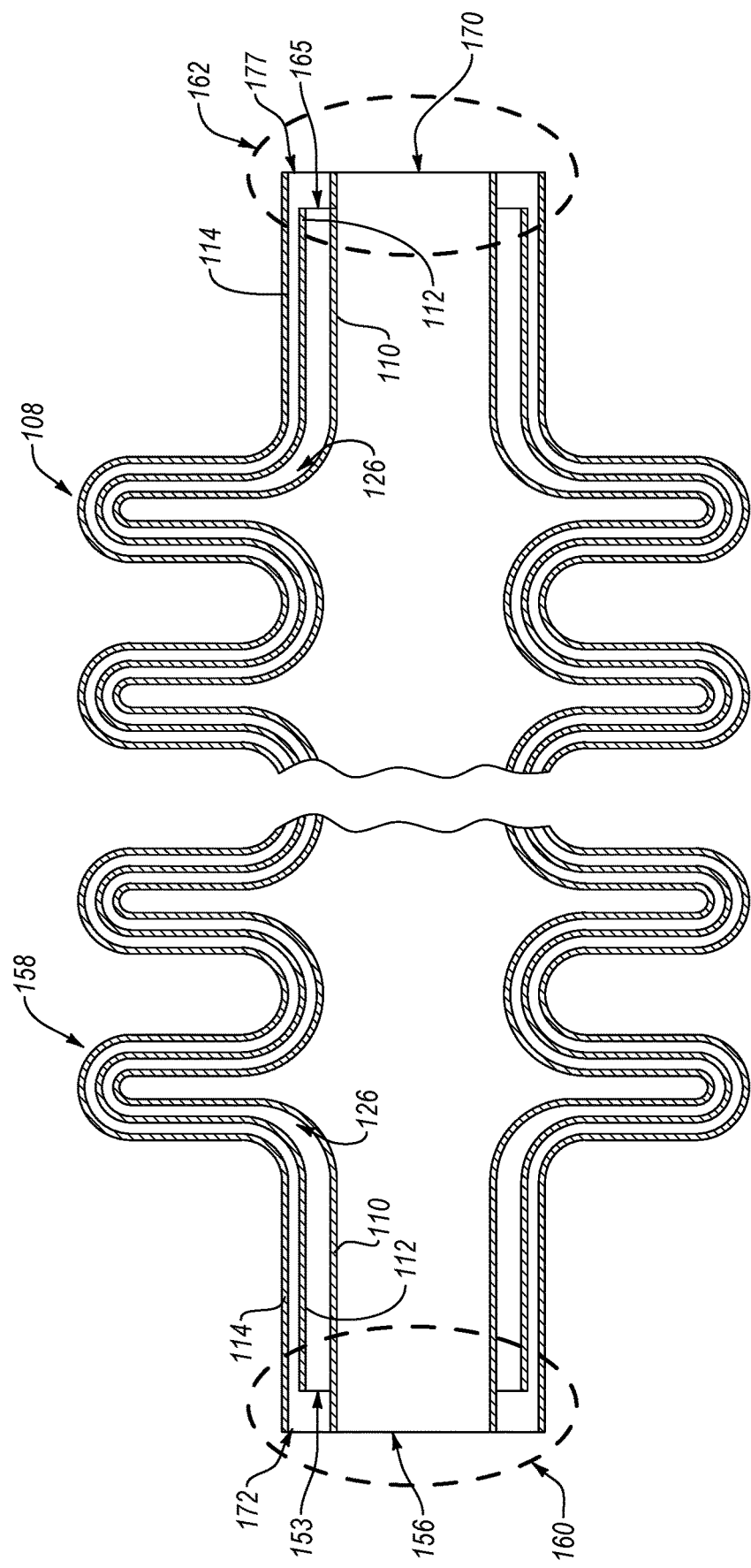
Figure 7:
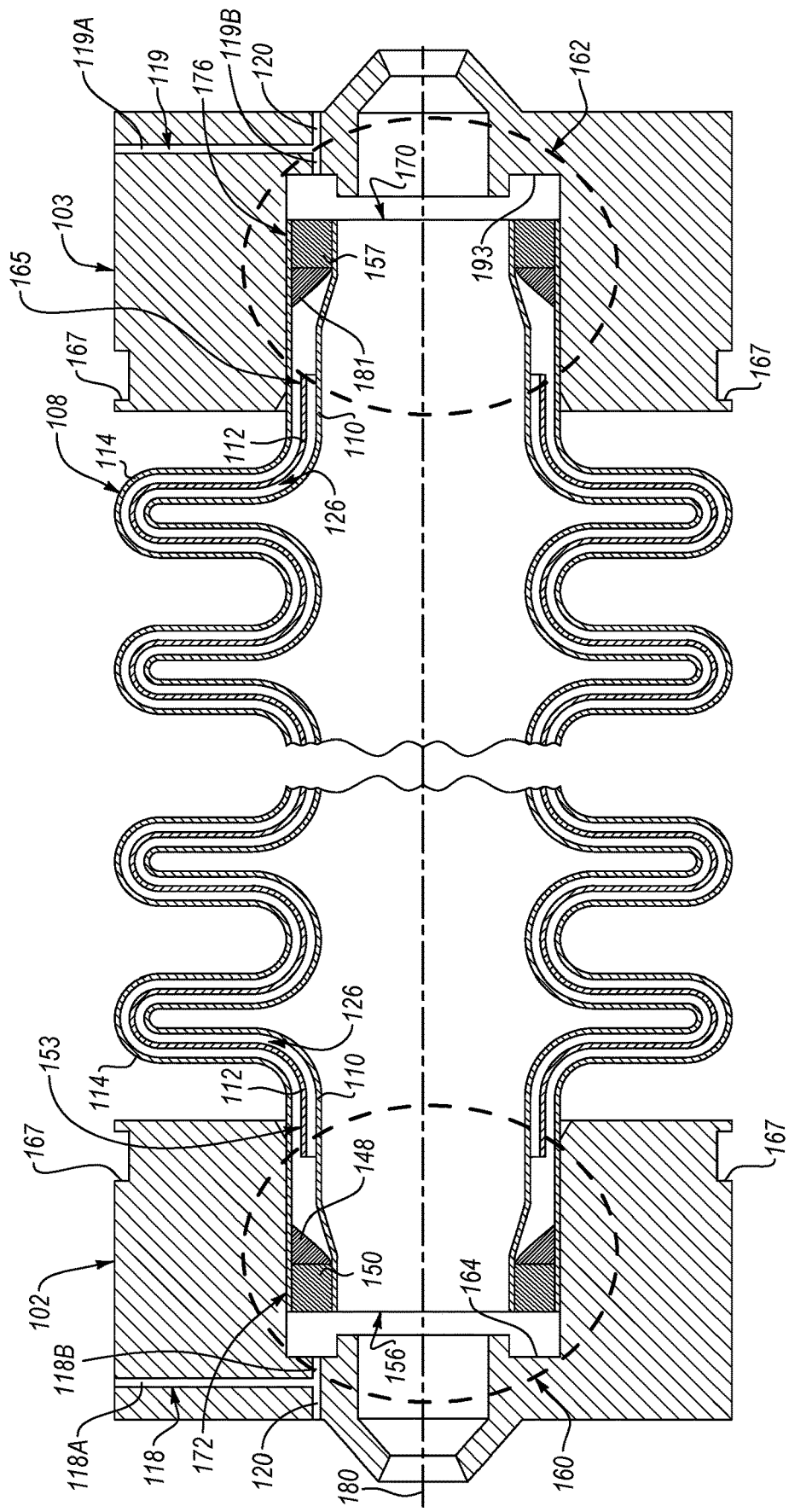
Figure 8:
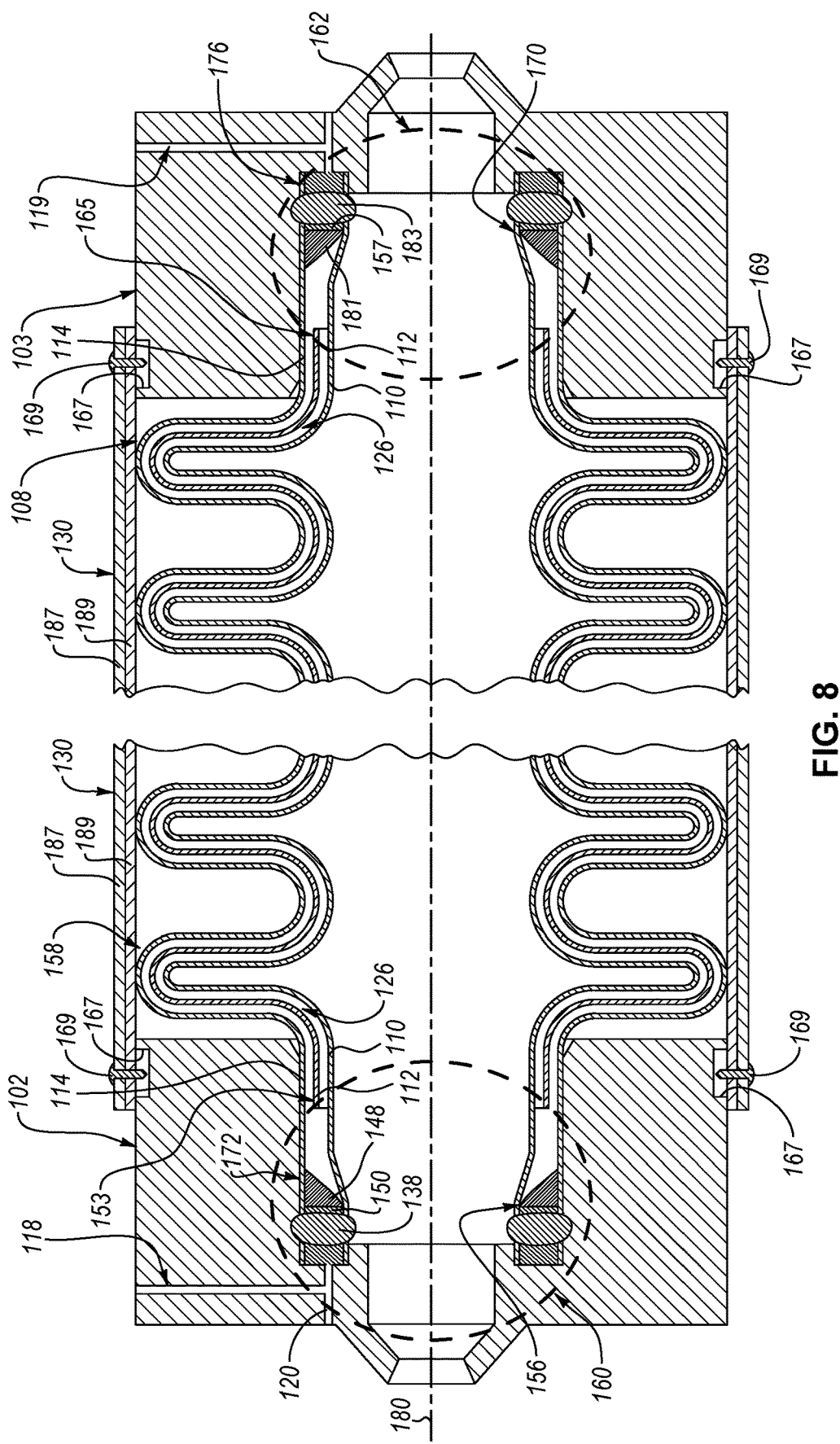
Figure 9:
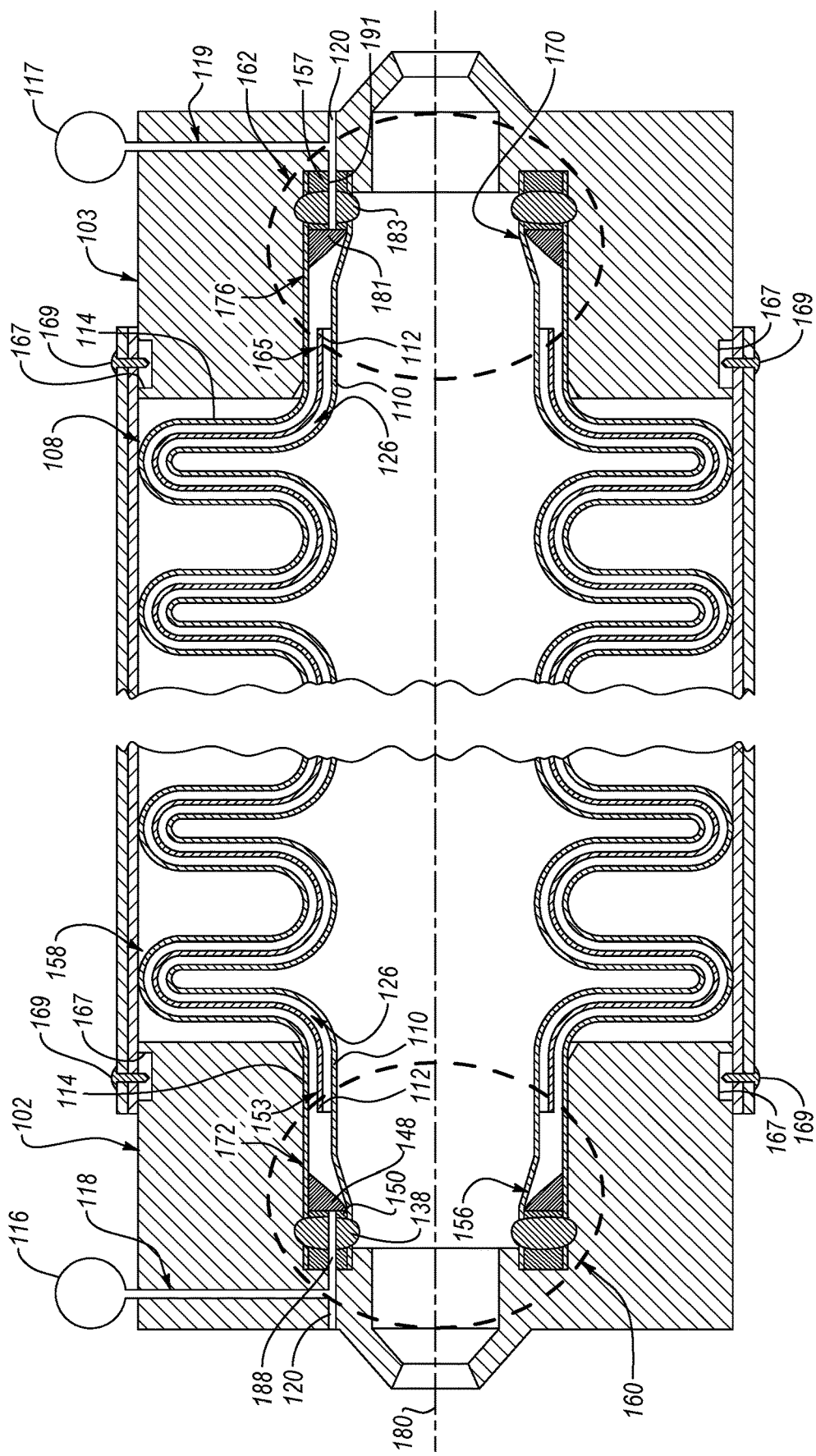
Figure 10:
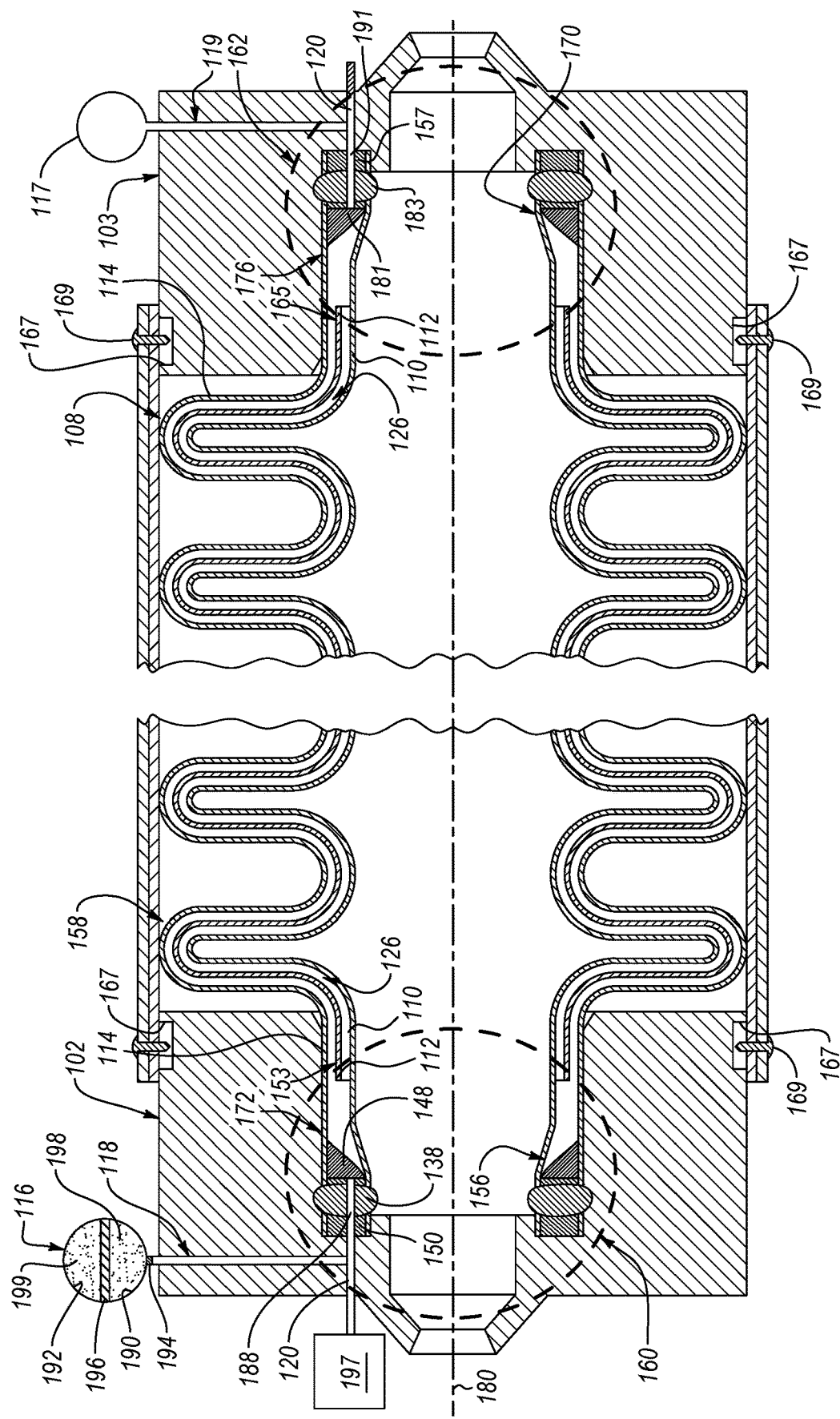
Figure 12:
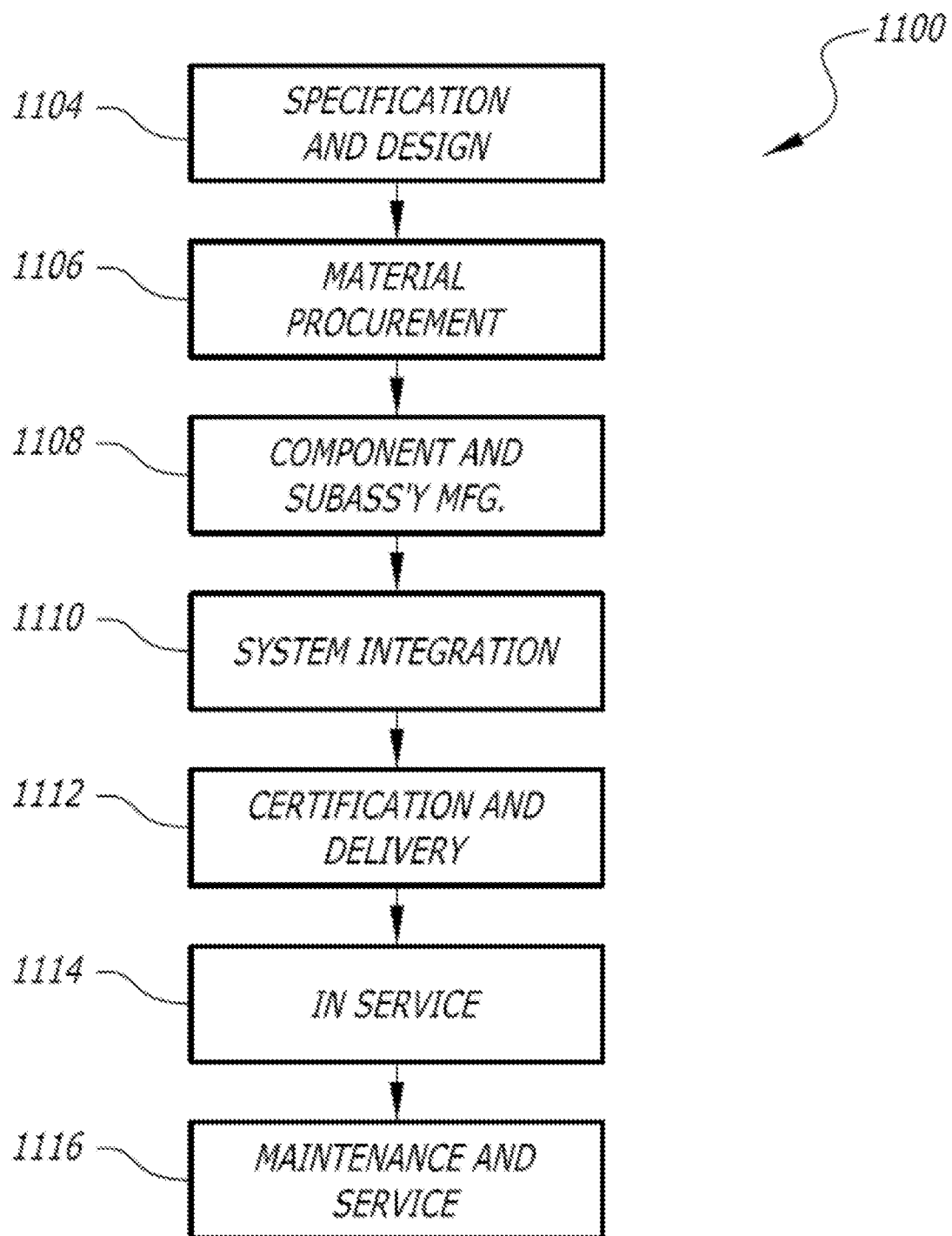

Having thus described one or more examples of the present disclosure in general terms, reference will now be made to the accompanying drawings, which are not necessarily drawn to scale, and wherein like reference characters designate the same or similar parts throughout the several views, and wherein:

FIGS. 1A, 1B, and 1C, collectively, are a block diagram of a conduit for transporting a fluid, according to one or more examples of the present disclosure;

FIG. 2 is a schematic, perspective, sectional view of a first collar portion of the conduit of FIGS. 1A, 1B, and 1C, according to one or more examples of the present disclosure;

FIG. 2A is a schematic, perspective, sectional view of a first collar portion of the conduit of FIGS. 1A, 1B, and 1C, according to one or more examples of the present disclosure;

FIG. 3 is a schematic, perspective, sectional view of the conduit of FIGS. 1A, 1B, and 1C, according to one or more examples of the present disclosure;

FIG. 3A is a schematic, perspective, sectional view of a second collar portion of the conduit of FIGS. 1A, 1B, and 1C, according to one or more examples of the present disclosure;

FIG. 4 is a schematic, perspective, sectional view of a sub-assembly of the conduit of FIGS. 1A, 1B, and 1C, according to one or more examples of the present disclosure;

FIG. 5 is a schematic, perspective, sectional view of a sub-assembly of the conduit of FIGS. 1A, 1B, and 1C, according to one or more examples of the present disclosure;

FIG. 6 is a schematic, perspective, sectional view of a sub-assembly of the conduit of FIGS. 1A, 1B, and 1C, according to one or more examples of the present disclosure;

FIG. 7 is a schematic, perspective, sectional view of a sub-assembly of the conduit of FIGS. 1A, 1B, and 1C, according to one or more examples of the present disclosure;

FIG. 8 is a schematic, perspective, sectional view of a sub-assembly of the conduit of FIGS. 1A, 1B, and 1C, according to one or more examples of the present disclosure;

FIG. 9 is a schematic, perspective, sectional view of a sub-assembly of the conduit of FIGS. 1A, 1B, and 1C, according to one or more examples of the present disclosure;

FIG. 10 is a schematic, perspective, sectional view of a sub-assembly of the conduit of FIGS. 1A, 1B, and 1C, according to one or more examples of the present disclosure;

FIGS. 11A-11D, collectively, are a block diagram of a method of fabricating a conduit of FIGS. 1A, 1B, and 1C, according to one or more examples of the present disclosure;

FIG. 12 is a block diagram of aircraft production and service methodology; and

Figure 13:
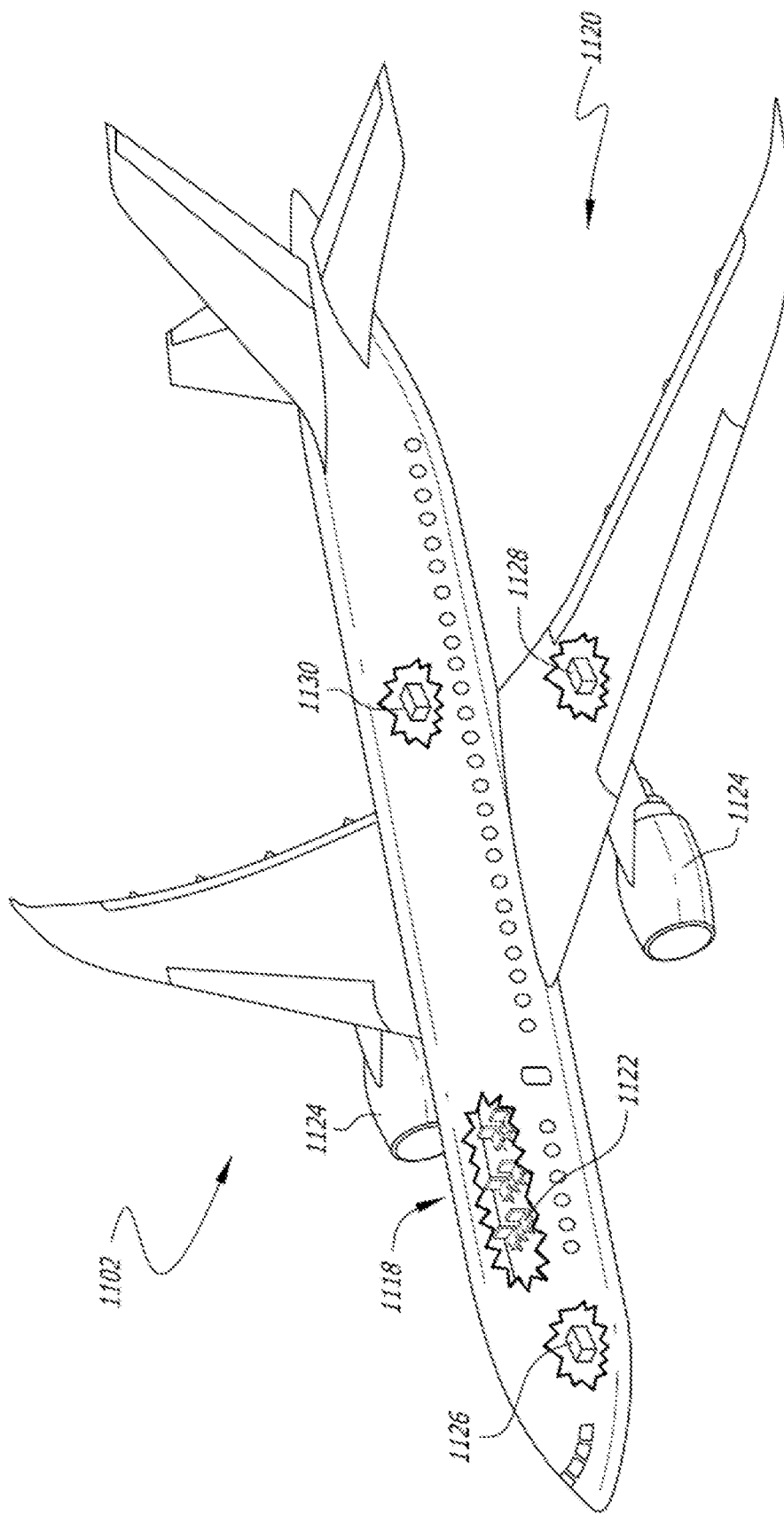

FIG. 13 is a schematic illustration of an aircraft.

DETAILED DESCRIPTION

In FIGS. 1A, 1B, and 1C, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1A, 1B, and 1C may be combined in various ways without the need to include other features described in FIGS. 1A, 1B, and 1C, other drawing figures, and/or the accompanying disclosure, even though such combination or combinations are not explicitly illustrated herein. Similarly, additional features not limited to the examples presented, may be combined with some or all of the features shown and described herein.

In FIGS. 11A-11D and 12, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 11A-11D and 12 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIGS. 1A and 1B and particularly to, e.g., FIGS. 2-3A, conduit 100 for transporting a fluid is disclosed. Conduit 100 comprises first collar 102 that comprises channel 118, which is cross-sectionally circumferentially closed, and second collar 103. Conduit 100 also comprises bellows 108 that comprises central axis 180, first corrugated outboard ply 114, corrugated inboard ply 110, interposed between first corrugated outboard ply 114 and central axis 180, interstitial space 126, interposed between corrugated inboard ply 110 and first corrugated outboard ply 114, and second corrugated outboard ply 112 within interstitial space 126. Conduit 100 further comprises first weld 138, hermetically interconnecting corrugated inboard ply 110, first corrugated outboard ply 114, and first collar 102. Conduit 100 additionally comprises second weld 183, hermetically interconnecting corrugated inboard ply 110, first corrugated outboard ply 114, and second collar 103. Conduit 100 also comprises weld-through ring 150, located between corrugated inboard ply 110 and first corrugated outboard ply 114 and coupled to first collar 102 by first weld 138. Conduit 100 further comprises sensor 116 that is communicatively coupled with interstitial space 126 via channel 118 of first collar 102. Second corrugated outboard ply 112 is not hermetically coupled to first collar 102 or second collar 103. The preceding subject matter of this paragraph characterizes example 1 of the present disclosure.

Conduit 100 provides a compliant structure for transmission of fluids, such as cryogenic fuels, that accommodates displacements encountered during operation. A configuration of weld-through ring 150 and interstitial space 126 between corrugated inboard ply 110 and first corrugated outboard ply 114 allows sensor 116 to monitor conditions within interstitial space 126. In particular, sensor 116 enables detection of leaks in corrugated inboard ply 110 by detecting changes in conditions within interstitial space 126. First weld 138 promotes a strong, reliable, and sealed connection between corrugated inboard ply 110, first corrugated outboard ply 114, and first collar 102. Similarly, second weld 183 promotes a strong, reliable, and sealed connection between corrugated inboard ply 110, first corrugated outboard ply 114, and second collar 103. Weld-through ring 150 ensures communicative coupling between interstitial space 126 and channel 118 of first collar 102, which establishes communicative coupling between sensor 116 and interstitial space 126. Communicatively coupling interstitial space 126 with sensor 116 via channel 118 allows fluid or gas that has leaked into interstitial space 126 through corrugated inboard ply 110 to be detected at a location, external to first collar 102. Second corrugated outboard ply 112 helps to stiffen bellows 108.

First weld 138 and second weld 183 help to respectively hermetically couple first end 160 of bellows 108 to first collar 102 and second end 162 of bellows 108, which is axially opposite first end 160 of bellows, to second collar 103. In some examples, each of first weld 138 and second weld 183 is a homogenous weld that includes filler material. Other welds of conduit 100 are homogenous welds in certain examples. Homogenous welds are helpful when welding relatively thin parts, such as corrugated inboard ply 110 and first corrugated outboard ply 114. In one or more examples, the filler material is a material with properties similar to those of the material of first collar 102 and second collar 103. According to certain examples, each of first collar 102, second collar 103, corrugated inboard ply 110, first corrugated outboard ply 114, and second corrugated outboard ply 112, is made of an austenitic nickel-chromium-based superalloy, such as Inconel®. Each of corrugated inboard ply 110, first corrugated outboard ply 114, and second corrugated outboard ply 112 has a thickness of about 0.012 inches, in some examples.

According to some examples, one or both of first collar 102 and second collar 103 is manufactured using subtractive manufacturing techniques, such as machining. In other examples, one or both of first collar 102 and second collar 103 is manufactured using additive manufacturing techniques. In yet other examples, one or both of first collar 102 and second collar 103 is manufactured using forging or casting techniques.

In some examples, first collar 102 is different than second collar 103. In one or more examples, first fluid flow port 132 of first collar 102 is of a first type, for fluidly coupling to a first component, and second fluid flow port 133 of second collar 103 is of a second type, for fluidly coupling to a second component, different than the first component. Each of first fluid flow port 132 and second fluid flow port 133 defines an aperture through which fluid flows into or out of conduit 100. In some examples, one of first fluid flow port 132 or second fluid flow port 133 is a nozzle.

Bellows 108 comprises corrugations 158 that help to facilitate compliance of bellows 108. For example, corrugations 158 allow bellows 108 to expand and retract, radially and longitudinally, relative to central axis 180, in response to changes in internal and external conditions relative to conduit 100 (e.g., changes in pressure, temperature, and geometry). Additionally, bellows 108 defines fluid flow channel 128, through which fluid is flowable.

In one or more examples, sensor 116 is any one of various sensors used to detect the presence of a chemical or a pressure change. In one of more examples, sensor 116 is one or more of a micro-fuel cell, contactless oxygen sensor spots, oxygen sensor foil, and oxygen probes.

Welds are continuous or annular shaped in one or more examples. Additionally, in one or more example, welds have closed shapes. As used herein, "hermetically coupled with a weld" means the weld is continuous and forms a closed shape.

As used in relation to channel 118, which is, for example, a port or a hole, "cross-sectionally circumferentially closed" means that the circumference of any cross-section of channel 118 that lies in a plane, perpendicular to a central axis of channel 118, has a closed shape. A closed shape is a space that is fully enclosed by an unbroken line or contour.

Referring generally to FIG. 1A and particularly to, e.g., FIGS. 2-3, conduit 100 further comprises tapered spacer 148, located within interstitial space 126. Tapered spacer 148 abuts weld-through ring 150. The preceding subject matter of this paragraph characterizes example 2 of the present disclosure, wherein example 2 also includes the subject matter according to example 1, above.

Tapered spacer 148 helps to maintain spacing between corrugated inboard ply 110 and first corrugated outboard ply 114 at a location, adjacent weld-through ring 150. More specifically, tapered spacer 148 helps to prevent corrugated inboard ply 110 from sharply collapsing around weld-through ring 150 when conduit 100 is pressurized, which can introduce undesirable stress risers.

Referring generally to FIG. 1A and particularly to, e.g., FIGS. 2-3, tapered spacer 148 is coextensive with at least a portion of first collar 102 along central axis 180 of bellows 108. The preceding subject matter of this paragraph characterizes example 3 of the present disclosure, wherein example 3 also includes the subject matter according to example 2, above.

Tapered spacer 148, being coextensive with at least a portion of first collar 102 along central axis 180 of bellows 108, helps to prevent stress risers from forming, in corrugated inboard ply 110 of bellows 108, within the bounds of first collar 102.

Referring generally to FIG. 1A and particularly to, e.g., FIGS. 2-3, tapered spacer 148 is tubular. Tapered spacer 148 comprises full-thickness end 147, abutting weld-through ring 150 and having a thickness equal to that of weld-through ring 150. Tapered spacer 148 also comprises reduced-thickness end 149, spaced apart from and opposite full-thickness end 147 and having a thickness less than that of weld-through ring 150. Tapered spacer 148 further comprises inner surface 173, facing central axis 180 and oblique relative to central axis 180. Inner surface 173 tapers radially outwardly relative to central axis 180 in a direction away from weld-through ring 150 along central axis 180. The preceding subject matter of this paragraph characterizes example 4 of the present disclosure, wherein example 4 also includes the subject matter according to example 2 or 3, above.

Full-thickness end 147 of tapered spacer 148, abutting weld-through ring 150, ensures corrugated inboard ply 110 does not collapse at location between tapered spacer 148 and weld-through ring 150 when conduit 100 is pressurized. Inner surface 173 of tapered spacer 148, tapering radially outwardly relative to central axis 180 in a direction away from weld-through ring 150 along central axis 180 toward reduced-thickness end 149, promotes a gradual reduction of the distance between corrugated inboard ply 110 and first corrugated outboard ply 114, or the size of interstitial space 126, when conduit 100 is pressurized, which helps reduce stress risers in corrugated inboard ply 110. The distance between corrugated inboard ply 110 and first corrugated outboard ply 114 reduces from a distance equal to a thickness T of weld-through ring 150.

Referring generally to FIG. 1A and particularly to, e.g., FIGS. 2-3, inner surface 173 of tapered spacer 148 has a linear taper. The preceding subject matter of this paragraph characterizes example 5 of the present disclosure, wherein example 5 also includes the subject matter according to example 4, above.

Taper of inner surface 173 of tapered spacer 148, being linear, promotes a constant reduction of the distance between corrugated inboard ply 110 and first corrugated outboard ply 114 when conduit 100 is pressurized, which helps to maintain a constant stress on corrugated inboard ply 110 along tapered spacer 148 when conduit 100 is pressurized.

Referring generally to FIG. 1A and particularly to, e.g., FIGS. 2-3, inner surface 173 of tapered spacer 148 has a non-linear taper. The preceding subject matter of this paragraph characterizes example 6 of the present disclosure, wherein example 6 also includes the subject matter according to example 4, above.

Taper of inner surface 173 of tapered spacer 148, being non-linear, promotes a reduction of the distance between corrugated inboard ply 110 and first corrugated outboard ply 114 at a varying rate when conduit 100 is pressurized, which helps to vary the stress on corrugated inboard ply 110 along tapered spacer 148 when conduit 100 is pressurized. In some examples, a non-linear taper is a concave taper, a convex taper, or an undulating taper.

Referring generally to FIG. 1A and particularly to, e.g., FIGS. 2-3, inner surface 173 of tapered spacer 148 tapers to a knife edge. The preceding subject matter of this paragraph characterizes example 7 of the present disclosure, wherein example 7 also includes the subject matter according to any one of examples 4 to 6, above.

Tapering inner surface 173 of tapered spacer 148 to a knife edge helps to smooth the transition of corrugated inboard ply 110 from tapered spacer 148 to first corrugated outboard ply 114 when conduit 100 is pressurized, which assists in reducing stress risers in corrugated inboard ply 110. As used herein, a knife edge is an edge wherein two surfaces, oblique to each other, terminate. In one or more examples, the two oblique surfaces have an acute included angle.

Referring generally to FIG. 1A and particularly to, e.g., FIGS. 2-3, bellows 108 comprises fluid flow channel 128, at least partially defined by corrugated inboard ply 110. A portion of corrugated inboard ply 110, in contact with tapered spacer 148, is configured to geometrically conform to inner surface 173 of tapered spacer 148 when fluid flow channel 128 is pressurized. The preceding subject matter of this paragraph characterizes example 8 of the present disclosure, wherein example 8 also includes the subject matter according to any one of examples 4 to 7, above.

A portion of corrugated inboard ply 110, in contact with tapered spacer 148, geometrically conforming to tapered spacer 148 when fluid flow channel 128 of bellows 108 is pressurized promotes a gradual reduction of the distance between corrugated inboard ply 110 and first corrugated outboard ply 114, or the size of interstitial space 126, which helps reduce stress risers in corrugated inboard ply 110.

Referring generally to FIG. 1A and particularly to, e.g., FIGS. 2-3, tapered spacer 148 is made of a permeable material. The preceding subject matter of this paragraph characterizes example 9 of the present disclosure, wherein example 9 also includes the subject matter according to any one of examples 2 to 8, above.

The permeable material of tapered spacer 148, which allows for the passing of liquids or gases to pass through the permeable material, enables changes in pressure or chemical composition in interstitial space 126 to reach channel 118 and thus sensor 116. As used herein, a permeable material is a material through which a fluid is able to flow.

Referring generally to FIG. 1A and particularly to, e.g., FIGS. 2-3, weld-through ring 150 is interposed between channel 118 and tapered spacer 148. The preceding subject matter of this paragraph characterizes example 10 of the present disclosure, wherein example 10 also includes the subject matter according to any one of examples 2 to 9, above.

Weld-through ring 150, interposed between channel 118 and tapered spacer 148, ensures corrugated inboard ply 110 does not collapse at channel 118, when conduit 100 is pressured, which facilitates communicative coupling between channel 118 and interstitial space 127.

Referring generally to FIG. 1A and particularly to, e.g., FIG. 2-3, weld-through ring 150 comprises port 188, passing through weld-through ring 150. Port 188 communicatively couples channel 118 with interstitial space 126. The preceding subject matter of this paragraph characterizes example 11 of the present disclosure, wherein example 11 also includes the subject matter according to any one of examples 1 to 9, above.

Port 188 of weld-through ring 150 facilitates communicative coupling between interstitial space 126 and channel 118 of first collar 102 through weld-through ring 150. Accordingly, port 188 of weld-through ring 150 enables welding of first corrugated outboard ply 114 and corrugated inboard ply 110 to first collar 102 with the same weld without affecting the ability of sensor 116 to detect conditions within interstitial space 126.

Referring generally to FIG. 1A and particularly to, e.g., FIG. 2-3, port 188 is parallel with central axis 180 of bellows 108. The preceding subject matter of this paragraph characterizes example 12 of the present disclosure, wherein example 12 also includes the subject matter according to example 11, above.

Port 188 of weld-through ring 150, being parallel with central axis 180 of bellows 108, enables access to interstitial space 126 without affecting integrity of first weld 138.

Referring generally to FIG. 1B and particularly to, e.g., FIGS. 3 and 3A, second collar 103 comprises second channel 119, which is cross-sectionally circumferentially closed. Conduit 100 further comprises second weld-through ring 157, located between corrugated inboard ply 110 and first corrugated outboard ply 114 and coupled to second collar 103 by second weld 183. Conduit 100 additionally comprises second sensor 117 that is communicatively coupled with interstitial space 126 via second channel 119 of second collar 103. The preceding subject matter of this paragraph characterizes example 13 of the present disclosure, wherein example 13 also includes the subject matter according to any one of examples 1 to 12, above.

A configuration of second weld-through ring 157 and interstitial space 126 between corrugated inboard ply 110 and first corrugated outboard ply 114 allows second sensor 117 to monitor conditions within interstitial space 126. In particular, second sensor 117 enables detection of leaks in corrugated inboard ply 110 by detecting changes in conditions within interstitial space 126. Second weld-through ring 157 ensures communicative coupling between interstitial space 126 and second channel 119 of second collar 103, which establishes communicative coupling between second sensor 117 and interstitial space 126. Communicatively coupling interstitial space 126 with second sensor 117 via second channel 119 allows leaks of fluid or gas into interstitial space 126 through corrugated inboard ply 110 to be detected at a location, external to second collar 103. Additionally, second sensor 117, being communicatively coupled with interstitial space 126 along with sensor 116, promotes redundant detection of leakage through corrugated inboard ply 110. In one or more examples, second sensor 117 is able to detect a change in pressure or chemical composition in interstitial space 126 that is not detectable by sensor 116 for various reasons, such as, for example, when fluid, leaking through corrugated inboard ply 110, does not reach sensor 116 or when sensor 116 is disabled.

As used in relation to second channel 119, which is, for example, a port or a hole, "cross-sectionally circumferentially closed" means that the circumference of any cross-section of second channel 119 that lies in a plane, perpendicular to a central axis of second channel 119, has a closed shape.

Referring generally to FIG. 1B and particularly to, e.g., FIGS. 3 and 3A, conduit 100 further comprises second tapered spacer 181, located within interstitial space 126. Second tapered spacer 181 abuts second weld-through ring 157. The preceding subject matter of this paragraph characterizes example 14 of the present disclosure, wherein example 14 also includes the subject matter according to example 13, above.

Second tapered spacer 181 helps to maintain spacing between corrugated inboard ply 110 and first corrugated outboard ply 114 at a location, adjacent second weld-through ring 157. More specifically, second tapered spacer 181 helps to prevent corrugated inboard ply 110 from sharply collapsing around second weld-through ring 157 when conduit 100 is pressurized, which can introduce undesirable stress risers.

Referring generally to FIG. 1B and particularly to, e.g., FIGS. 3 and 3A, second tapered spacer 181 is coextensive with at least a portion of second collar 103 along central axis 180 of bellows 108. The preceding subject matter of this paragraph characterizes example 15 of the present disclosure, wherein example 15 also includes the subject matter according to example 14, above.

Second tapered spacer 181, being coextensive with at least a portion of second collar 103 along central axis 180 of bellows 108, helps to prevent stress risers from forming, in corrugated inboard ply 110 of bellows 108, within the bounds of second collar 103.

Referring generally to FIGS. 3 and 3A and particularly to, e.g., FIGS. 3 and 3A, second tapered spacer 181 is tubular. Second tapered spacer 181 comprises second full-thickness end 159, abutting second weld-through ring 157 and having a thickness equal to that of second weld-through ring 157, second reduced-thickness end 195, spaced apart from and opposite second full-thickness end 159 and having a thickness less than that of second weld-through ring 157, and second inner surface 175, facing central axis 180 and oblique relative to central axis 180. Second inner surface 175 tapers radially outwardly relative to central axis 180 in a direction away from second weld-through ring 157 along central axis 180. The preceding subject matter of this paragraph characterizes example 16 of the present disclosure, wherein example 16 also includes the subject matter according to example 14 or 15, above.

Second full-thickness end 159 of second tapered spacer 181, abutting second weld-through ring 157, ensures corrugated inboard ply 110 does not collapse at location between second tapered spacer 181 and second weld-through ring 157 when conduit 100 is pressurized. Second inner surface 175 of second tapered spacer 181, tapering radially outwardly relative to central axis 180 in a direction away from second weld-through ring 157 along central axis 180 toward second reduced-thickness end 195, promotes a gradual reduction of the distance between corrugated inboard ply 110 and first corrugated outboard ply 114, or the size of interstitial space 126, which helps reduce stress risers in corrugated inboard ply 110. The distance between corrugated inboard ply 110 and first corrugated outboard ply 114 reduces from a distance equal to a thickness T2 of second weld-through ring 157

Referring generally to FIG. 1B and particularly to, e.g., FIGS. 3 and 3A, second inner surface 175 of second tapered spacer 181 has a linear taper. The preceding subject matter of this paragraph characterizes example 17 of the present disclosure, wherein example 17 also includes the subject matter according to example 16, above.

Taper of second inner surface 175 of second tapered spacer 181, being linear, promotes a constant reduction of the distance between corrugated inboard ply 110 and first corrugated outboard ply 114 when conduit 100 is pressurized, which helps to maintain a constant stress on corrugated inboard ply 110 along second tapered spacer 181 when conduit 100 is pressurized.

Referring generally to FIG. 1B and particularly to, e.g., FIGS. 3 and 3A, second inner surface 175 of second tapered spacer 181 has a non-linear taper. The preceding subject matter of this paragraph characterizes example 18 of the present disclosure, wherein example 18 also includes the subject matter according to example 16, above.

Taper of second inner surface 175 of second tapered spacer 181, being non-linear, promotes a reduction of the distance between corrugated inboard ply 110 and second corrugated outboard ply 112 at a varying rate when conduit 100 is pressurized, which helps to vary the stress on corrugated inboard ply 110 along second tapered spacer 181 when conduit 100 is pressurized.

Referring generally to FIG. 1B and particularly to, e.g., FIGS. 3 and 3A, second inner surface of second tapered spacer tapers to a knife edge. The preceding subject matter of this paragraph characterizes example 19 of the present disclosure, wherein example 19 also includes the subject matter according to any one of examples 16 to 18, above.

Tapering second inner surface 175 of second tapered spacer 181 to a knife edge helps to smooth the transition of corrugated inboard ply 110 from second tapered spacer 181 to second corrugated outboard ply 112 when conduit 100 is pressurized, which assists in reducing stress risers in corrugated inboard ply 110.

Referring generally to FIG. 1B and particularly to, e.g., FIGS. 3 and 3A, bellows 108 comprises fluid flow channel 128, at least partially defined by corrugated inboard ply 110. A portion of corrugated inboard ply 110, in contact with second tapered spacer 181, is configured to geometrically conform to second inner surface 175 of second tapered spacer 181 when fluid flow channel 128 is pressurized. The preceding subject matter of this paragraph characterizes example 20 of the present disclosure, wherein example 20 also includes the subject matter according to any one of examples 16 to 19, above.

A portion of corrugated inboard ply 110, in contact with second tapered spacer 181, geometrically conforming to second tapered spacer 181 when fluid flow channel 128 of bellows 108 is pressurized promotes a gradual reduction of the distance between corrugated inboard ply 110 and second corrugated outboard ply 112, or the size of interstitial space 126, when conduit 100 is pressurized, which helps reduce stress risers in corrugated inboard ply 110.

Referring generally to FIG. 1B and particularly to, e.g., FIGS. 3 and 3A, second tapered spacer 181 is made of a permeable material. The preceding subject matter of this paragraph characterizes example 21 of the present disclosure, wherein example 21 also includes the subject matter according to any one of examples 14 to 20, above.

The permeable material of second tapered spacer 181, which allows for the passing of liquids or gases to pass through the permeable material, enables changes in pressure or chemical composition in interstitial space 126 to reach second channel 119 and thus second sensor 117.

Referring generally to FIG. 1B and particularly to, e.g., FIGS. 3 and 3A, second weld-through ring 157 is interposed between second channel 119 and second tapered spacer 181. The preceding subject matter of this paragraph characterizes example 22 of the present disclosure, wherein example 22 also includes the subject matter according to any one of examples 14 to 21, above.

Second weld-through ring 157, interposed between second channel 119 and second tapered spacer 181, ensures corrugated inboard ply 110 does not collapse at second channel 119, when conduit 100 is pressured, which facilitates communicative coupling between second channel 119 and interstitial space 127.

Referring generally to FIG. 1B and particularly to, e.g., FIGS. 3 and 3A, second weld-through ring 157 comprises second port 191, passing through second weld-through ring 157. Second port 191 communicatively couples second channel 119 with interstitial space 126. The preceding subject matter of this paragraph characterizes example 23 of the present disclosure, wherein example 23 also includes the subject matter according to any one of examples 13 to 22, above.

Second port 191 of second weld-through ring 157 facilitates communicative coupling between interstitial space 126 and second channel 119 of second collar 103. Accordingly, port 188 of weld-through ring 150 enables welding of first corrugated outboard ply 114 and corrugated inboard ply 110 to second collar 103 with the same weld without affecting the ability of second sensor 117 to detect conditions within interstitial space 126.

Referring generally to FIG. 1B and particularly to, e.g., FIGS. 3 and 3A, second port 191 is parallel with central axis 180 of bellows 108. The preceding subject matter of this paragraph characterizes example 24 of the present disclosure, wherein example 24 also includes the subject matter according to example 23, above.

Second port 191 of second weld-through ring 157, being parallel with central axis 180 of bellows 108, enables access to interstitial space 126 without affecting integrity of second weld 183.

Referring generally to FIGS. 1A and 1B and particularly to, e.g., FIGS. 2-3A, first collar 102 is a single-piece structure. Second collar is a single-piece structure. The preceding subject matter of this paragraph characterizes example 25 of the present disclosure, wherein example 25 also includes the subject matter according to any one of examples 1 to 24, above.

First collar 102, being a single-piece, monolithic structure, and second collar 103, being a single-piece, monolithic structure, simplifies the fabrication of conduit 100 and promotes strength and reliability of first collar 102 and second collar 103, since joining of multiple pieces to form first collar 102 and second collar 103 via welding or otherwise is avoided. As used herein, a single-piece structure is monolithic or made of only one piece, rather than several pieces joined together.

Referring generally to FIGS. 1A and 1B and particularly to, e.g., FIGS. 2-3A and 7-10, first collar 102 comprises first annular pocket 164. A portion of corrugated inboard ply 110, a portion of first corrugated outboard ply 114, and a portion of weld-through ring 150 are located within first annular pocket 164 of first collar 102. The preceding subject matter of this paragraph characterizes example 26 of the present disclosure, wherein example 26 also includes the subject matter according to any one of examples 1 to 25, above.

First annular pocket 164 helps to receive, retain, and align corrugated inboard ply 110, first corrugated outboard ply 114, and weld-through ring 150 for welding to first collar 102. Similarly, second annular pocket 193 helps to receive, retain, and align corrugated inboard ply 110 and first corrugated outboard ply 114 for welding to second collar 103.

Referring generally to FIGS. 1A and 1B and particularly to, e.g., FIGS. 2 and 3, conduit 100 further comprises sheath 130 that comprises reinforcement layer 187. First corrugated outboard ply 114 is interposed between sheath 130 and central axis 180. The preceding subject matter of this paragraph characterizes example 27 of the present disclosure, wherein example 27 also includes the subject matter according to any one of examples 1 to 26, above.

Reinforcement layer 187 of sheath 130 helps to protect bellows 108 from external objects.

Referring generally to FIGS. 1A and 1B and particularly to, e.g., FIGS. 2 and 3, sheath 130 is coupled to first collar 102 and to second collar 103. The preceding subject matter of this paragraph characterizes example 28 of the present disclosure, wherein example 28 also includes the subject matter according to example 27, above.

Coupling sheath 130 to first collar 102 and second collar 103 ensures outer periphery of bellows 108, in its entirety, is protected.

Referring generally to FIGS. 1A and 1B and particularly to, e.g., FIGS. 2 and 3, sheath 130 is movable relative to first collar 102 and relative to second collar 103. The preceding subject matter of this paragraph characterizes example 29 of the present disclosure, wherein example 29 also includes the subject matter according to example 28, above.

Sheath 130, being movable relative to first collar 102 and second collar 103, facilitates compliance of sheath 130 relative to bellows 108 by allowing sheath 130 to move with bellows 108 during use of conduit 100.

Referring generally to FIGS. 1A and 1B and particularly to, e.g., FIGS. 2 and 3, sheath 130 is translatable along central axis 180 relative to first collar 102 and relative to second collar 103. The preceding subject matter of this paragraph characterizes example 30 of the present disclosure, wherein example 30 also includes the subject matter according to example 29, above.

Sheath 130, being translatable along central axis 180 relative to first collar 102, accommodates lengthening e.g., expansion and shortening e.g., contraction of bellows 108 during use of conduit 100.

In some examples, sheath 130 is coupled to each of first collar 102 and second collar 103 by pins 169 engaged with slots 167 formed in first collar 102 and second collar. Each one of slots 167 is elongated along central axis 180. Each of pins 169 passes through a corresponding end of sheath 130 and passes into a corresponding one of slots 167. Sheath 130 is non-movably fixed to pins 169, but each of pins 169 is allowed to translatably move along the corresponding one of slots 167, which facilitates translational movement of sheath 130 along central axis 180 relative to first collar 102 and second collar 103. According to one example, each one of slots 167 has a width, substantially equal to a width of pins 169, which prevents pins 169, and thus sheath 130, from rotating about central axis 180 relative to first collar 102 and second collar 103.

Referring generally to FIGS. 1A and 1B and particularly to, e.g., FIGS. 2 and 3, sheath 130 is rotatable about central axis 180 relative to first collar 102 and relative to second collar 103. The preceding subject matter of this paragraph characterizes example 31 of the present disclosure, wherein example 31 also includes the subject matter according to example 29 or 30, above.

Sheath 130, being rotatable about central axis 180 relative to first collar 102 and second collar 103, accommodates rotation of bellows 108 about central axis 180 during use of conduit 100.

In some examples, slots 167 formed in first collar 102 and second collar 103, are at least partially annular. Accordingly, pins 169, when engaged with slots 167, are allowed to move translatably along slots 167 in a circumferential direction relative to first collar 102 and second collar 103. Such movement of pins 169 within slots 167 facilitates rotational movement of sheath 130 about central axis 180 relative to first collar 102 and second collar 103. According to one example, each one of slots 167 has a width that is substantially equal to a width of each one of pins 169, which prevents pins 169, and thus sheath 130, from translating along central axis 180 relative to first collar 102 and second collar 103. However, in at least one other example, each one of slots 167 has a width that is greater than the width of each one of pins 169. Each one of slots 167, having a width that is greater than the width of each one of pins 169, accommodates both rotational movement of sheath 130 about central axis 180 relative to first collar 102 and second collar 103 and translational movement of sheath 130 along central axis 180 relative to first collar 102 and second collar 103.

Referring generally to FIGS. 1A and 1B and particularly to, e.g., FIGS. 2 and 3, sheath 130 further comprises low-friction layer 189, interposed between reinforcement layer 187 of sheath 130 and first corrugated outboard ply 114 of bellows 108. Low-friction layer 189 of sheath 130 has a surface roughness lower than that of reinforcement layer 187 of sheath 130. The preceding subject matter of this paragraph characterizes example 32 of the present disclosure, wherein example 32 also includes the subject matter according to any one of examples 27 to 31, above.

Low-friction layer 189 of sheath 130 helps to reduce abrasions between reinforcement layer 187 and bellows 108, particularly when bellows 108 moves relative to sheath 130.

According to some examples, the surface roughness of low-friction layer 189 corresponds with a coefficient-of-friction of the low-friction layer 189 between 0.05 and 0.1, and the surface roughness of reinforcement layer 187 corresponds with a coefficient-of-friction that is higher than that of low-friction layer 189. Low-friction layer 189 of sheath 130 is made of a low-friction material, such as polytetrafluoroethylene, Nylon®, Teflon®, and the like, in some examples. Reinforcement layer 187 is made of a high-abrasion-resistance material, such as fiberglass, aramid, stainless steel (mesh), in certain examples.

Referring generally to FIGS. 1A and 1B and particularly to, e.g., FIGS. 2 and 3, low-friction layer 189 of sheath 130 is in contact with first corrugated outboard ply 114 of bellows 108. The preceding subject matter of this paragraph characterizes example 33 of the present disclosure, wherein example 33 also includes the subject matter according to example 32, above.

Low-friction layer 189 of sheath 130, being in contact with first corrugated outboard ply 114, ensures that the outside diameter of sheath 130 is as small as possible for use in confined spaces.

Referring generally to FIG. 1A and particularly to, e.g., FIGS. 2-3A, pressure in interstitial space 126 and in channel 118 is no more than 15 pounds per square inch (psi). The preceding subject matter of this paragraph characterizes example 34 of the present disclosure, wherein example 34 also includes the subject matter according to any one of examples 1 to 33, above.

When conduit 100 is used in space, maintaining pressure in interstitial space 126 at or below 15 psi provides controlled separation between corrugated inboard ply 110, first corrugated outboard ply 114, and second corrugated outboard ply 112, which prevents corrugated inboard ply 110, first corrugated outboard ply 114, and second corrugated outboard ply 112 from pressing against each other excessively. Preventing corrugated inboard ply 110, first corrugated outboard ply 114, and second corrugated outboard ply 112 from pressing against each other excessively helps facilitate transfer, to first sensor 116, of any fluid (e.g., propellant) that has leaked into interstitial space 126. As used herein, pounds per square inch (psi) is absolute pressure.

Referring generally to FIG. 1A and particularly to, e.g., FIGS. 2-3A, pressure in interstitial space 126 and in channel 118 is no more than 5 psi. The preceding subject matter of this paragraph characterizes example 35 of the present disclosure, wherein example 35 also includes the subject matter according example 34, above.

Maintaining pressure in interstitial space 126 at or below 5 psi ensures pressure in interstitial space 126 is not excessive when conduit 100 is used in space. Additionally, providing some pressure at or below 5 psi in interstitial space 126 provides some controlled separation between corrugated inboard ply 110 and first corrugated outboard ply 114.

Referring generally to FIG. 1A and particularly to, e.g., FIGS. 2-3A, sensor 116 is configured to detect a pressure change in interstitial space 126. The preceding subject matter of this paragraph characterizes example 36 of the present disclosure, wherein example 36 also includes the subject matter according to any one of examples 1 to 35, above.

Pressurized fluid leaking from corrugated inboard ply 110 can cause a change in pressure in interstitial space 126. Sensor 116, being configured to detect a pressure change in interstitial space 126, allows leakage of fluid from corrugated inboard ply 110 to be detected. Furthermore, in some examples, sensor 116, being configured to detect a pressure change in interstitial space 126, is agnostic to the type of fluid transmitted through conduit 100 and leaking from corrugated inboard ply 110, which helps to increase the versatility of conduit 100.

Referring generally to FIGS. 1A and 1C and particularly to, e.g., FIGS. 2-3A, sensor 116 is configured to detect a chemical change in interstitial space 126. The preceding subject matter of this paragraph characterizes example 37 of the present disclosure, wherein example 37 also includes the subject matter according to any one of examples 1 to 35, above.

Sensor 116, being configured to detect a change in chemical composition in interstitial space 126, allows leakage of fluid from corrugated inboard ply 110 to be detected. Furthermore, in some examples, sensor 116, being configured to detect a change in chemical composition in interstitial space 126, is agnostic to the pressure of fluid transmitted through conduit 100 and pressure of fluid in interstitial space 126, which helps to increase the versatility of conduit 100.

Referring generally to FIGS. 1A and 1C and particularly to, e.g., FIG. 10, sensor 116 comprises first chamber 190, containing first reactant 198, and second chamber 192, containing second reactant 199. Second chamber 192 is isolated from first chamber 190 and is communicatively coupled with channel 118 of first collar 102. First reactant 198 is identical to second reactant 199. The preceding subject matter of this paragraph characterizes example 38 of the present disclosure, wherein example 38 also includes the subject matter according to example 37, above.

First reactant 198, being the same as second reactant 199, facilitates contrasting visual conditions if first reactant 198 reacts with gas leaking into interstitial space 126. Because first reactant 198 and second reactant 199 are the same, the contrasting visual conditions occur despite changes in lighting conditions or discoloration of first reactant 198 and second reactant 199 due to time or atmospheric conditions. Contrasting visual conditions is enhanced by configuring first chamber 190 and second chamber 192 in a side-by-side configuration.

Referring generally to FIG. 1A and particularly to, e.g., FIGS. 2-3, channel 118 comprises first portion 118A and second portion 118B, perpendicular to first portion 118A. The preceding subject matter of this paragraph characterizes example 39 of the present disclosure, wherein example 39 also includes the subject matter according to any one of examples 1 to 38, above.

Channel 118, having first portion 118A and second portion 118B, enables positioning of sensor 116 radially, or perpendicularly relative to central axis 180, relative to first collar 102, rather than axially, or parallel to central axis 180, relative to first collar 102. Similarly, second channel 119, having third portion 119A and fourth portion 119B that is perpendicular to first portion 118A, enables positioning of second sensor 117 radially, or perpendicularly relative to central axis 180, relative to second collar 103, rather than axially, or parallel to central axis 180, relative to second collar 103.

In some examples, second portion 118B is co-axial with port 188 and first portion 118A is obtuse or perpendicular relative to second portion 118B. Second portion 118B is formed concurrently with port 188, in some examples. Similarly, in some examples, fourth portion 119B of second channel 119 is co-axial with second port 191 and third portion 119A of second channel 119 is obtuse or perpendicular relative to fourth portion 119B. Fourth portion 119B is formed concurrently with second port 191, in some examples.

Referring generally to FIGS. 1A and 1B and particularly to, e.g., FIGS. 2 and 3, conduit 200 for transporting a fluid is disclosed. Conduit 200 comprises first collar 102 that comprises channel 118, which is cross-sectionally circumferentially closed. Conduit 200 also comprises bellows 108 that comprises central axis 180 and first corrugated outboard ply 114. Bellows 108 further comprises corrugated inboard ply 110, interposed between first corrugated outboard ply 114 and central axis 180. Bellows 108 additionally comprises interstitial space 126, interposed between corrugated inboard ply 110 and first corrugated outboard ply 114. Bellows 108 also comprises second corrugated outboard ply 112 within interstitial space 126. Conduit 200 additionally comprises first weld 138, hermetically coupling corrugated inboard ply 110, first corrugated outboard ply 114, and first collar 102. Conduit 200 also comprises weld-through ring 150, located between corrugated inboard ply 110 and first corrugated outboard ply 114 and coupled to first collar 102 by first weld 138. Conduit 200 further comprises sensor 116 that is communicatively coupled with interstitial space 126 via channel 118 of first collar 102. Second corrugated outboard ply 112 is not hermetically coupled to first collar 102. The preceding subject matter of this paragraph characterizes example 40 of the present disclosure.

Conduit 200 provides a compliant structure for transmission of fluids, such as cryogenic fuels, that accommodates displacements encountered during operation. A configuration of weld-through ring 150 and interstitial space 126 between corrugated inboard ply 110 and first corrugated outboard ply 114 allows sensor 116 to monitor conditions within interstitial space 126. In particular, sensor 116 enables detection of leaks in corrugated inboard ply 110 by detecting changes in conditions within interstitial space 126. First weld 138 promotes a strong, reliable, and sealed connection between corrugated inboard ply 110, first corrugated outboard ply 114, and first collar 102. Weld-through ring 150 ensures communicative coupling between interstitial space 126 and channel 118 of first collar 102, which establishes communicative coupling between sensor 116 and interstitial space 126. Communicatively coupling interstitial space 126 with sensor 116 via channel 118 allows fluid or gas that has leaked into interstitial space 126 through corrugated inboard ply 110 to be detected at a location, external to first collar 102. Second corrugated outboard ply 112 helps to stiffen bellows 108.

Referring generally to FIGS. 11A-11E and particularly to, e.g., FIGS. 2-10, method 300 of fabricating conduit 100, 200 is disclosed. Method 300 comprises (block 202) simultaneously corrugating first tubular outboard ply 115, second tubular outboard ply 113, inserted into first tubular outboard ply 115, and tubular inboard ply 111, inserted into second tubular outboard ply 113, to form bellows 108. Bellows 108 comprises central axis 180, first corrugated outboard ply 114, second corrugated outboard ply 112, corrugated inboard ply 110, and an interstitial space 126, interposed between corrugated inboard ply 110 and first corrugated outboard ply 114. First corrugated outboard ply 114 is formed from first tubular outboard ply 115, second corrugated outboard ply 112 is formed from second tubular outboard ply 113, and corrugated inboard ply 110 is formed from tubular inboard ply 111. Method 300 also comprises (block 204) simultaneously trimming first corrugated-inboard-ply end 151 of corrugated inboard ply 110 and first first-corrugated-outboard-ply end 174 of first corrugated outboard ply 114 to create trimmed first corrugated-inboard-ply end 156 of corrugated inboard ply 110 and trimmed first first-corrugated-outboard-ply end 172 of first corrugated outboard ply 114. Method 300 further comprises (block 206) simultaneously trimming second corrugated-inboard-ply end 163 of corrugated inboard ply 110 and second first-corrugated-outboard-ply end 176 of first corrugated outboard ply 114 to create trimmed second corrugated-inboard-ply end 170 of corrugated inboard ply 110 and trimmed second first-corrugated-outboard-ply end 177 of first corrugated outboard ply 114. Method 300 additionally comprises (block 208) locating weld-through ring 150 between corrugated inboard ply 110 and first corrugated outboard ply 114 of bellows 108 at trimmed first corrugated-inboard-ply end 156 of corrugated inboard ply 110 and trimmed first first-corrugated-outboard-ply end 172 of first corrugated outboard ply 114. Method 300 also comprises (block 210) locating second weld-through ring 157 between corrugated inboard ply 110 and first corrugated outboard ply 114 of bellows 108 at trimmed second corrugated-inboard-ply end 170 of corrugated inboard ply 110 and trimmed second first-corrugated-outboard-ply end 177 of first corrugated outboard ply 114. Method 300 further comprises (block 212) simultaneously attaching trimmed first corrugated-inboard-ply end 156, trimmed first first-corrugated-outboard-ply end 172, and weld-through ring 150 to first collar 102 with first weld 138. Method 300 additionally comprises (block 214) simultaneously attaching trimmed second corrugated-inboard-ply end 170, trimmed second first-corrugated-outboard-ply end 177, and second weld-through ring 157 to second collar 103 with second weld 183. Method 300 also comprises (block 216) forming port 188 through weld-through ring 150 along an axis, parallel with central axis 180 of bellows 108, after attaching weld-through ring 150 to first collar 102 with first weld 138, so that port 188 is communicatively coupled with interstitial space 126. Method 300 additionally comprises (block 218) forming second port 191 through second weld-through ring 157 along a second axis, parallel with central axis 180 of bellows 108, after attaching second weld-through ring 157 to second collar 103 with second weld 183, so that second port 191 is communicatively coupled with interstitial space 126. Method 300 additionally comprises (block 220) communicatively coupling sensor 116 with interstitial space 126 via port 188. Method 300 also comprises (block 222) communicatively coupling second sensor 117 with interstitial space 126 via second port 191 and second channel 119 passing through second collar 103. The preceding subject matter of this paragraph characterizes example 41 of the present disclosure.

Method 300 facilitates fabrication of conduit 100, 200 in an efficient and simple manner. Conduit 100, 200 provides a compliant structure for transmission of fluids, such as cryogenic fuels, that accommodates displacements encountered during operation. Simultaneously corrugating first tubular outboard ply 115, second tubular outboard ply 113, and tubular inboard ply 111 to form bellows 108 promotes corrugations 158 in corrugated inboard ply 110, first corrugated outboard ply 114, and second corrugated outboard ply 112 of bellows 108 that are complementary to each other. The ends of the plies being unconstrained relative to the first collar and the second collar, helps reduce stress on the plies of the bellows, during formation of the corrugations of the bellows, by allowing the plies to be freely slidable relative to each other as the corrugations are formed. Simultaneously trimming first corrugated-inboard-ply end 151 of corrugated inboard ply 110 and first first-corrugated-outboard-ply end 174 of first corrugated outboard ply 114 promotes controlled alignment of trimmed first corrugated-inboard-ply end 156 of corrugated inboard ply 110 and trimmed first first-corrugated-outboard-ply end 174 of first corrugated outboard ply 114. Similarly, simultaneously trimming second corrugated-inboard-ply end 163 of corrugated inboard ply 110 and second first-corrugated-outboard-ply end 176 of second corrugated outboard ply 112 promotes controlled alignment of trimmed second corrugated-inboard-ply end 170 of corrugated inboard ply 110 and trimmed second first-corrugated-outboard-ply end 176 of first corrugated outboard ply 114. Weld-through ring 150 facilitates formation of first weld 138 while ensuring communicative coupling between interstitial space 126 and channel 118 of first collar 102, which establishes communicative coupling between sensor 116 and interstitial space 126. Second weld-through ring 157 facilitates formation of second weld 183 while ensuring communicative coupling between interstitial space 126 and second channel 119 of second collar 103, which establishes communicative coupling between second sensor 117 and interstitial space 126. Port 188 of weld-through ring 150 facilitates communicative coupling between interstitial space 126 and channel 118 of first collar 102 after formation of first weld 138. Second port 191 of second weld-through ring 157 facilitates communicative coupling between interstitial space 126 and second channel 119 of second collar 103 after formation of second weld 183. Forming port 188 after trimmed first corrugated-inboard-ply end 156, trimmed first first-corrugated-outboard-ply end 172, and weld-through ring 150 are simultaneously attached to first collar 102 with first weld 138 allows communicative coupling between interstitial space 126 and channel 118 of first collar 102 after first weld 138 is formed. Forming second port 191 after trimmed second corrugated-inboard-ply end 170, trimmed second first-corrugated-outboard-ply end 177, and second weld-through ring 157 are simultaneously attached to second collar 103 with second weld 183 allows communicative coupling between interstitial space 126 and second channel 119 of second collar 103 after second weld 183 is formed Communicatively coupling interstitial space 126 with sensor 116 via port 188 and channel 118 passing through first collar 102 allows leaks of fluid or gas into interstitial space 126 through corrugated inboard ply 110 to be detected at a location, external to first collar 102. Communicatively coupling interstitial space 126 with second sensor 117 via second port 191 and second channel 119 passing through second collar 103 allows leaks of fluid or gas into interstitial space 126 through corrugated inboard ply 110 to be detected at a location, external to second collar 103.

First weld 138 penetrates into first collar 102 through both of corrugated inboard ply 110 and first corrugated outboard ply 114 and through weld-through ring 150. Similarly, second weld 183 penetrates into second collar 103 through both of corrugated inboard ply 110 and first corrugated outboard ply 114 and through second weld-through ring 157.

After corrugating second tubular outboard ply 113, second corrugated outboard ply 112 comprises first second-corrugated-outboard-ply end 153 and second second-tubular-outboard-ply end 165, which is axially opposite first second-corrugated-outboard-ply end 153.

Figure 11A:
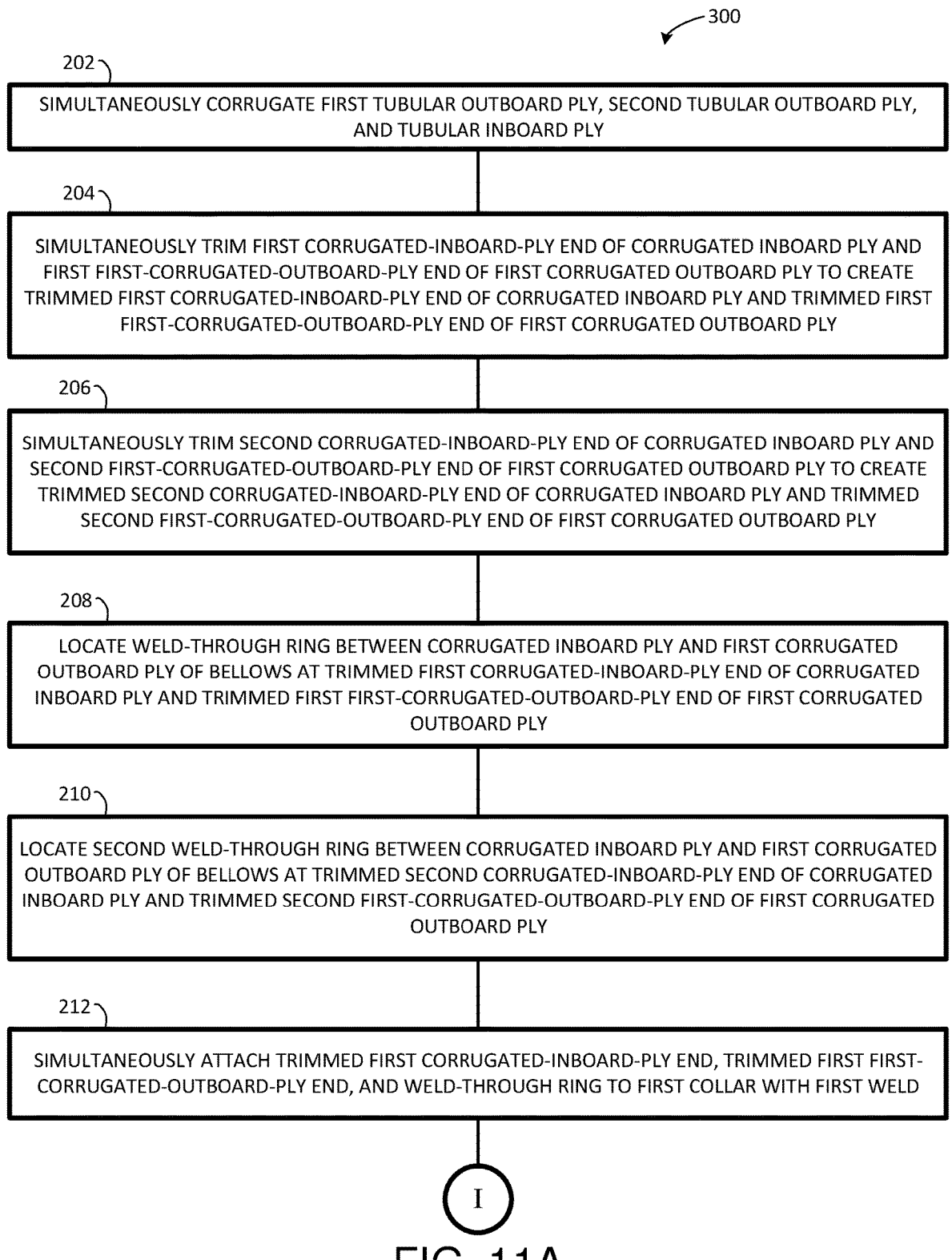
Figure 11B:
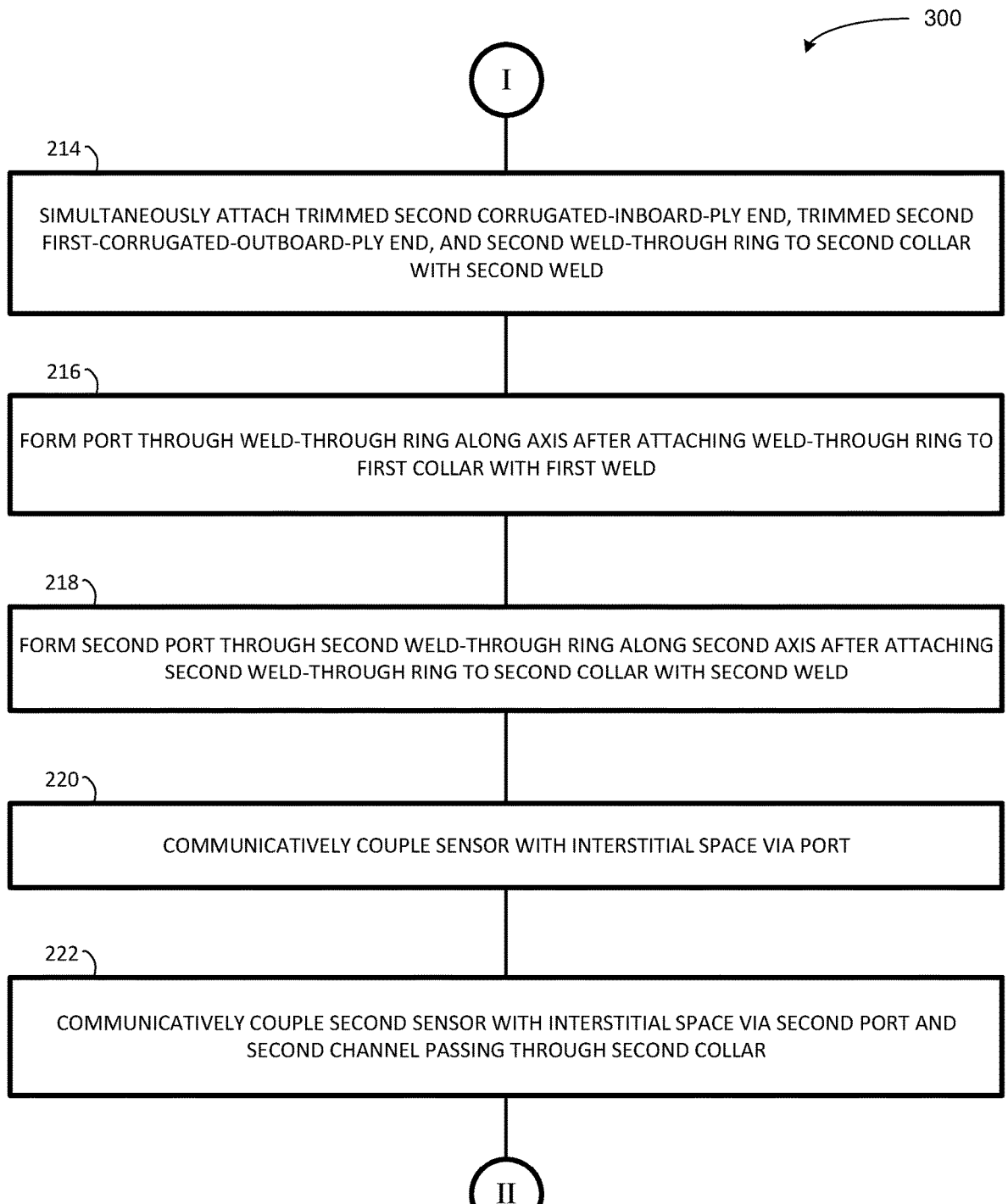

Referring generally to FIG. 11A and particularly to, e.g., FIGS. 4 and 5, according to method 300, second tubular outboard ply 113, in its entirety, is within first tubular outboard ply 115 when first tubular outboard ply 115, second tubular outboard ply 113, and tubular inboard ply 111 are simultaneously corrugated. The preceding subject matter of this paragraph characterizes example 42 of the present disclosure, wherein example 42 also includes the subject matter according to example 41, above.

Second tubular outboard ply 113, in its entirety, being within first tubular outboard ply 115 when first tubular outboard ply 115, second tubular outboard ply 113, and tubular inboard ply 111 are simultaneously corrugated, facilitates an axial offset of first second-corrugated-outboard-ply end 153 of second corrugated outboard ply 112 away from trimmed first corrugated-inboard-ply end 156 and trimmed first first-corrugated-outboard-ply end 172 and facilitates an axial offset of second second-corrugated-outboard-ply end 165 of second corrugated outboard ply 112 away from trimmed second corrugated-inboard-ply end 170 and trimmed second first-corrugated-outboard-ply end 177, which ensures second corrugated outboard ply 112 does not obstruct with first weld 138 and second weld 183.

Referring generally to FIG. 11A and particularly to, e.g., FIGS. 4 and 5, according to method 300, second tubular outboard ply 113 is shorter than first tubular outboard ply 115 and tubular inboard ply 111. The preceding subject matter of this paragraph characterizes example 43 of the present disclosure, wherein example 43 also includes the subject matter according to example 41 or 42, above.

Second tubular outboard ply 113, being shorter than first tubular outboard ply 115, facilitates an axial offset of first second-corrugated-outboard-ply end 153 of second corrugated outboard ply 112 away from trimmed first corrugated-inboard-ply end 156 and trimmed first first-corrugated-outboard-ply end 172 and facilitates an axial offset of second second-corrugated-outboard-ply end 165 of second corrugated outboard ply 112 away from trimmed second corrugated-inboard-ply end 170 and trimmed second first-corrugated-outboard-ply end 177, which ensures second corrugated outboard ply 112 does not obstruct with first weld 138 and second weld 183.

Figure 11C:
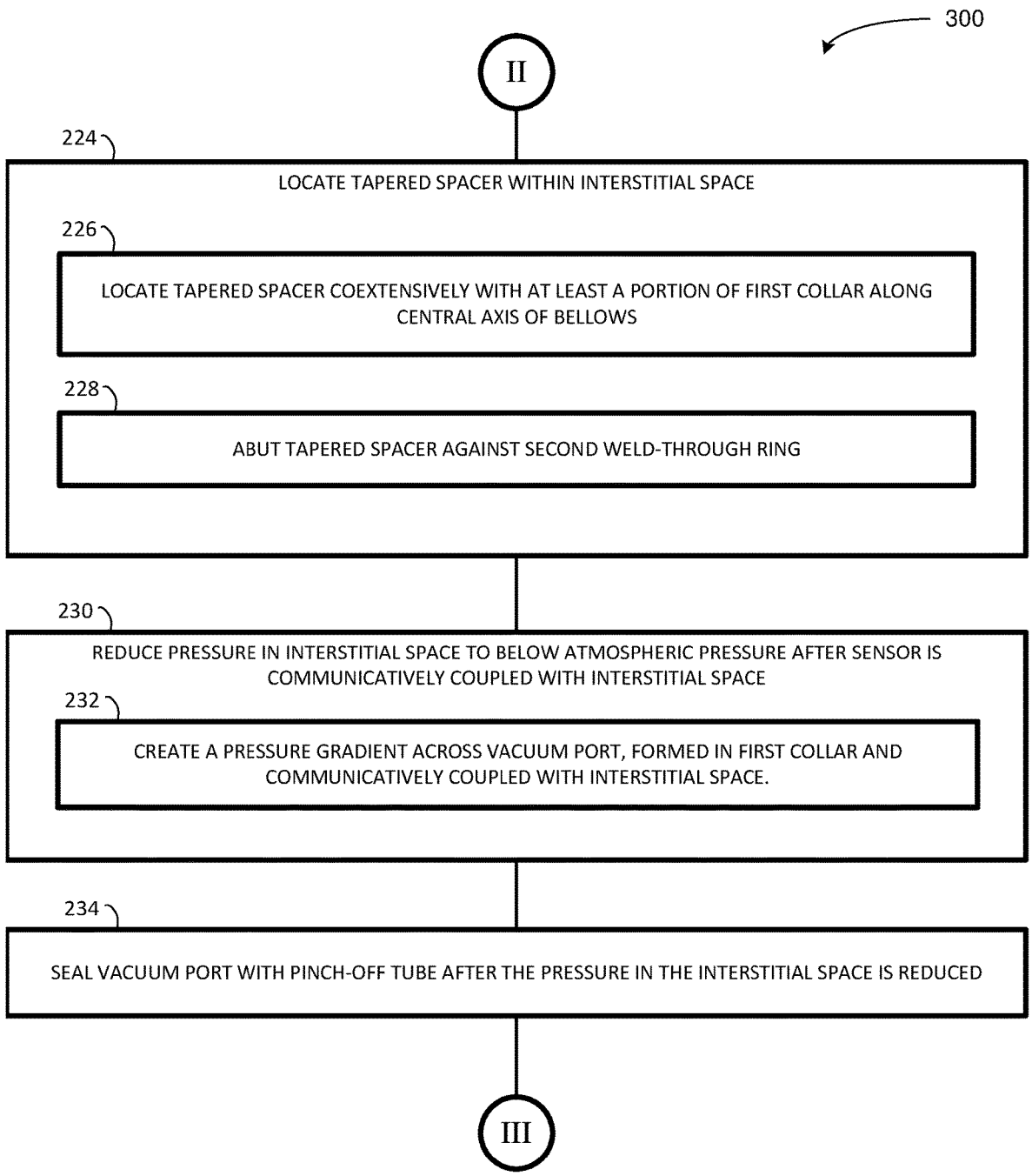

Referring generally to FIG. 11C and particularly to, e.g., FIGS. 2-3 and 7-10, method 300 further comprises (block 224) locating tapered spacer 148 within interstitial space 126. Tapered spacer 148 is made of a permeable material. The preceding subject matter of this paragraph characterizes example 44 of the present disclosure, wherein example 44 also includes the subject matter according to any one of examples 41 to 43, above.

Tapered spacer 148 helps to maintain spacing between corrugated inboard ply 110 and first corrugated outboard ply 114 at a location, adjacent weld-through ring 150. More specifically, tapered spacer 148 helps to prevent corrugated inboard ply 110 from sharply collapsing around weld-through ring 150 when conduit 100 is pressurized, which can introduce stress risers when conduit 100 is pressurized.

Referring generally to FIG. 11C and particularly to, e.g., FIGS. 2-3 and 7-10, according to method 300, (block 224) locating tapered spacer 148 comprises (block 226) locating tapered spacer 148 coextensively with at least a portion of first collar 102 along central axis 180 of bellows 108. The preceding subject matter of this paragraph characterizes example 45 of the present disclosure, wherein example 45 also includes the subject matter according to example 44, above.

Tapered spacer 148, being coextensive with at least a portion of first collar 102 along central axis 180 of bellows 108, helps to prevent stress risers from forming, in corrugated inboard ply 110 of bellows 108, within the bounds of first collar 102.

Referring generally to FIG. 11C and particularly to, e.g., FIGS. 2-3 and 7-10, according to method 300, (block 224) locating tapered spacer 148 comprises (block 228) abutting tapered spacer 148 against weld-through ring 150. The preceding subject matter of this paragraph characterizes example 46 of the present disclosure, wherein example 46 also includes the subject matter according to example 44 or 45, above.

Abutting tapered spacer 148 against weld-through ring 150 helps to maintain spacing between corrugated inboard ply 110 and first corrugated outboard ply 114 at a location, adjacent weld-through ring 150. More specifically, abutting tapered spacer 148 against weld-through ring 150 helps to prevent corrugated inboard ply 110 from sharply collapsing around weld-through ring 150 when conduit 100 is pressurized, which can introduce undesirable stress risers.

Referring generally to FIG. 11C and particularly to, e.g., FIGS. 2-3 and 10, method 300 further comprises (block 230) reducing pressure in interstitial space 126 to below atmospheric pressure after sensor 116 is communicatively coupled with interstitial space 126. The preceding subject matter of this paragraph characterizes example 47 of the present disclosure, wherein example 47 also includes the subject matter according to any one of examples 41 to 46, above.

Reducing pressure in interstitial space 126 to below atmospheric pressure helps to prevent excessive separation of corrugated inboard ply 110 and second corrugated outboard ply 112 when conduit 100 is used in outer space or outside of the Earth's atmosphere. Furthermore, reducing pressure in interstitial space 126 to below atmospheric pressure promotes a controlled separation of corrugated inboard ply 110 and first corrugated outboard ply 114 when conduit 100 is used in outer space or outside of the Earth's atmosphere. Such a controlled separation helps to keep corrugated inboard ply 110 and first corrugated outboard ply 114 from excessively pressing against each other, which could impede the transfer of fluid or gas e.g., propellant from reaching channel 118 and sensor 116. Additionally, controlled separation helps to reduce damage e.g., scuffing caused by contact between corrugated inboard ply 110 and first corrugated outboard ply 114.

Referring generally to FIG. 11C and particularly to, e.g., FIGS. 2-3 and 10, according to method 300, pressure in interstitial space 126 is reduced by (block 232) creating a pressure gradient across vacuum port 120, formed in first collar 102 and communicatively coupled with interstitial space 126. The preceding subject matter of this paragraph characterizes example 48 of the present disclosure, wherein example 48 also includes the subject matter according to example 47, above.

Vacuum port 120 promotes the reduction of pressure in interstitial space 126 when sensor 116 is communicatively coupled to channel 118. In one or more examples, pump 197 is communicatively coupled to vacuum port 120 and selectively operable to create the pressure gradient across vacuum port 120.

Referring generally to FIG. 11C and particularly to, e.g., FIGS. 2 and 3, method 300 further comprises (block 234) sealing vacuum port 120 with pinch-off tube 140 after the pressure in interstitial space 126 is reduced. The preceding subject matter of this paragraph characterizes example 49 of the present disclosure, wherein example 49 also includes the subject matter according to example 48, above.

Pinch-off tube 140 provides quick and easy sealing of vacuum port 120 after pressure is reduced. Pump 197 is communicatively coupled to vacuum port 120 by pinch-off tube 140. In some examples, pinch-off tube 140 has a sufficient length that is conducive to multiple pressure-reduction and closing operations.

Figure 11D:
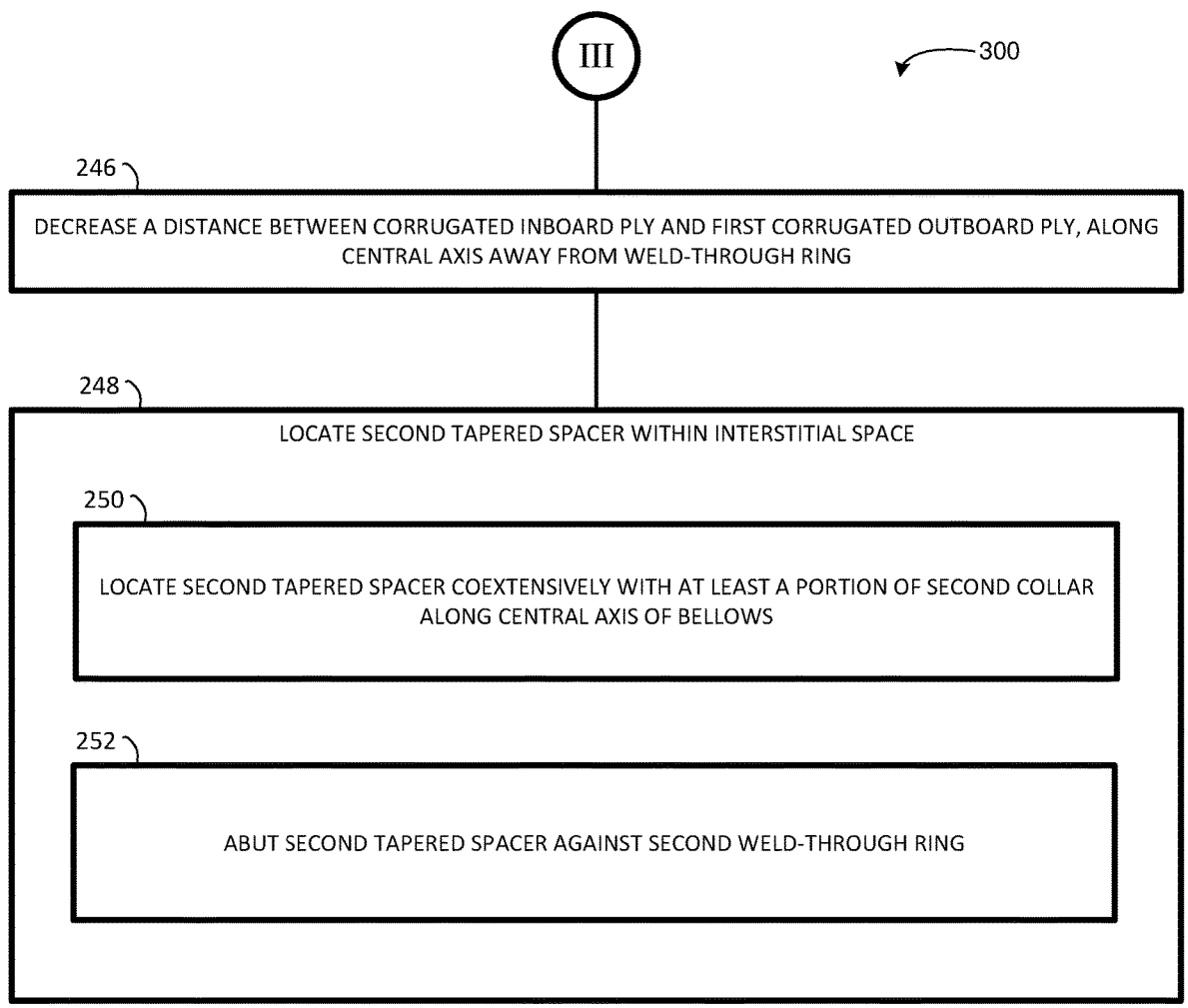

Referring generally to FIG. 11D and particularly to, e.g., FIGS. 2-3 and 7-10, method 300 further comprises (block 246) decreasing a distance between corrugated inboard ply 110 and second corrugated outboard ply 112 along central axis 180 away from weld-through ring 150. The preceding subject matter of this paragraph characterizes example 50 of the present disclosure, wherein example 50 also includes the subject matter according to any one of examples 41 to 49, above.

Decreasing the distance along central axis 180 away from weld-through ring 150 allows the distance to be smaller away from first collar 102, while allowing the distance to be larger at first collar 102. Allowing the distance to be smaller away from first collar 102 promotes compliancy of bellows 108 away from first collar 102. In contrast, allowing the distance to be larger at weld-through ring 150 helps to ensure interstitial space 126 is open to channel 118.

Referring generally to FIG. 11D and particularly to, e.g., FIGS. 3, 3A, and 7-10, method 300 further comprises (block 248) locating second tapered spacer 181 within interstitial space 126. Second tapered spacer 181 is made from a permeable material. The preceding subject matter of this paragraph characterizes example 51 of the present disclosure, wherein example 51 also includes the subject matter according to any one of examples 41 to 50, above.

Second tapered spacer 181 helps to maintain spacing between corrugated inboard ply 110 and first corrugated outboard ply 114 at a location, adjacent second weld-through ring 157. More specifically, second tapered spacer 181 helps to prevent corrugated inboard ply 110 from sharply collapsing around second weld-through ring 157, which can introduce stress risers when conduit 100 is pressurized.

Referring generally to FIG. 11D and particularly to, e.g., FIGS. 3 and 3A, according to method 300, (block 248) locating second tapered spacer 181 within interstitial space 126 comprises (block 250) locating second tapered spacer 181 coextensively with at least a portion of second collar 103 along central axis 180 of bellows 108. The preceding subject matter of this paragraph characterizes example 52 of the present disclosure, wherein example 52 also includes the subject matter according to example 51, above.

Second tapered spacer 181, being coextensive with at least a portion of second collar 103 along central axis 180 of bellows 108, helps to prevent stress risers from forming, in corrugated inboard ply 110 of bellows 108, within the bounds of first collar 102.

Referring generally to FIG. 11D and particularly to, e.g., FIGS. 3 and 3A, according to method 300, (block 248) locating second tapered spacer 181 within interstitial space 126 comprises (block 252) abutting second tapered spacer 181 against second weld-through ring 157. The preceding subject matter of this paragraph characterizes example 53 of the present disclosure, wherein example 53 also includes the subject matter according to examples 51 or 52, above.

Abutting second tapered spacer 181 against second weld-through ring 157 helps to maintain spacing between corrugated inboard ply 110 and first corrugated outboard ply 114 at a location, adjacent second weld-through ring 157. More specifically, abutting second tapered spacer 181 against second weld-through ring 157 helps to prevent corrugated inboard ply 110 from sharply collapsing around second weld-through ring 157 when conduit 100 is pressurized, which can introduce undesirable stress risers.

Examples of the present disclosure may be described in the context of aircraft manufacturing and service method 1100 as shown in FIG. 12 and aircraft 1102 as shown in FIG. 13. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 13, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method (300) of fabricating a conduit (100), the method (300) comprising:

simultaneously corrugating a first tubular outboard ply (115), a second tubular outboard ply (113), inserted into the first tubular outboard ply (115), and a tubular inboard ply (111), inserted into the second tubular outboard ply (113), to form a bellows (108), comprising a central axis (180), a first corrugated outboard ply (114), a second corrugated outboard ply (112), a corrugated inboard ply (110), and an interstitial space (126), interposed between the corrugated inboard ply (110) and the first corrugated outboard ply (114), and wherein the first corrugated outboard ply (114) is formed from the first tubular outboard ply (115), the second corrugated outboard ply (112) is formed from the second tubular outboard ply (113), and the corrugated inboard ply (110) is formed from the tubular inboard ply (111);

simultaneously trimming a first corrugated-inboard-ply end (151) of the corrugated inboard ply (110) and a first first-corrugated-outboard-ply end (174) of the first corrugated outboard ply (114) to create a trimmed first corrugated-inboard-ply end (156) of the corrugated inboard ply (110) and a trimmed first first-corrugated-outboard-ply end (172) of the first corrugated outboard ply (114);

simultaneously trimming a second corrugated-inboard-ply end (163) of the corrugated inboard ply (110) and a second first-corrugated-outboard-ply end (176) of the first corrugated outboard ply (114) to create a trimmed second corrugated-inboard-ply end (170) of the corrugated inboard ply (110) and a trimmed second first-corrugated-outboard-ply end (177) of the first corrugated outboard ply (114);

locating a weld-through ring (150) between the corrugated inboard ply (110) and the first corrugated outboard ply (114) of the bellows (108) at the trimmed first corrugated-inboard-ply end (156) of the corrugated inboard ply (110) and the trimmed first first-corrugated-outboard-ply end (172) of the first corrugated outboard ply (114);

locating a second weld-through ring (157) between the corrugated inboard ply (110) and the first corrugated outboard ply (114) of the bellows (108) at the trimmed second corrugated-inboard-ply end (170) of the corrugated inboard ply (110) and the trimmed second first-corrugated-outboard-ply end (177) of the first corrugated outboard ply (114);

simultaneously attaching the trimmed first corrugated-inboard-ply end (156), the trimmed first first-corrugated-outboard-ply end (172), and the weld-through ring (150) to a first collar (102) with a first weld (138);

simultaneously attaching the trimmed second corrugated-inboard-ply end (170), the trimmed second first-corrugated-outboard-ply end (177), and the second weld-through ring (157) to a second collar (103) with a second weld (183);

forming a port (188) through the weld-through ring (150) along an axis, parallel with the central axis (180) of the bellows (108), after attaching the weld-through ring (150) to the first collar (102) with the first weld (138), so that the port (188) is communicatively coupled with the interstitial space (126);

forming a second port (191) through the second weld-through ring (157) along a second axis, parallel with the central axis (180) of the bellows (108), after attaching the second weld-through ring (157) to the second collar (103) with the second weld (183), so that the second port (191) is communicatively coupled with the interstitial space (126);

communicatively coupling a sensor (116) with the interstitial space (126) via the port (188); and communicatively coupling a second sensor (117) with the interstitial space (126) via the second port (191) and a second channel (119) passing through the second collar (103).

2. The method (300) according to claim 1, wherein the second tubular outboard ply (113), in its entirety, is within the first tubular outboard ply (115) when the first tubular outboard ply (115), the second tubular outboard ply (113), and the tubular inboard ply (111) are simultaneously corrugated.

3. The method (300) according to claim 1, wherein the second tubular outboard ply (113) is shorter than the first tubular outboard ply (115) and the tubular inboard ply (111).

4. The method (300) according to claim 1, further comprising a step of locating a tapered spacer (148) within the interstitial space (126), and wherein the tapered spacer (148) is made of a permeable material.

5. The method (300) according to claim 4, wherein the step of locating the tapered spacer (148) comprises locating the tapered spacer (148) coextensively with at least a portion of the first collar (102) along the central axis (180) of the bellows (108).

6. The method (300) according to claim 4, wherein the step of locating the tapered spacer (148) comprises abutting the tapered spacer (148) against the weld-through ring (150).

7. The method (300) according to claim 1, further comprising reducing pressure in the interstitial space (126) to below atmospheric pressure after the sensor (116) is communicatively coupled with the interstitial space (126).

8. The method (300) according to claim 7, wherein the pressure in the interstitial space (126) is reduced by creating a pressure gradient across a vacuum port (120), formed in the first collar (102) and communicatively coupled with the interstitial space (126).

9. The method (300) according to claim 8, further comprising sealing the vacuum port (120) with a pinch-off tube (140) after the pressure in the interstitial space (126) is reduced.

10. The method (300) according to claim 1, wherein the method (300) further comprises decreasing a distance between the corrugated inboard ply (110) and the first corrugated outboard ply (114) along the central axis (180) away from the weld-through ring (150).

11. The method (300) according to claim 1, further comprising a step of locating a second tapered spacer (181) within the interstitial space (126), and wherein the second tapered spacer (181) is made from a permeable material.

12. The method (300) according to claim 11, wherein the step of locating the second tapered spacer (181) within the interstitial space (126) comprises locating the second tapered spacer (181) coextensively with at least a portion of the second collar (103) along the central axis (180) of the bellows (108).

13. The method (300) according to claim 11, wherein the step of locating the second tapered spacer (181) within the interstitial space (126) comprises abutting the second tapered spacer (181) against the second weld-through ring (157).

14. The method (300) according to claim 2, wherein the second tubular outboard ply (113) is shorter than the first tubular outboard ply (115) and the tubular inboard ply (111).

15. The method (300) according to claim 2, further comprising a step of locating a tapered spacer (148) within the interstitial space (126), and wherein the tapered spacer (148) is made of a permeable material.

16. The method (300) according to claim 3, further comprising a step of locating a tapered spacer (148) within the interstitial space (126), and wherein the tapered spacer (148) is made of a permeable material.

17. The method (300) according to claim 5, wherein the step of locating the tapered spacer (148) comprises abutting the tapered spacer (148) against the weld-through ring (150).

18. The method (300) according to claim 12, wherein the step of locating the second tapered spacer (181) within the interstitial space (126) comprises abutting the second tapered spacer (181) against the second weld-through ring (157).

19. The method (300) according to claim 2, further comprising reducing pressure in the interstitial space (126) to below atmospheric pressure after the sensor (116) is communicatively coupled with the interstitial space (126).

20. The method (300) according to claim 3, further comprising reducing pressure in the interstitial space (126) to below atmospheric pressure after the sensor (116) is communicatively coupled with the interstitial space (126).

* * * * *